(12) United States Patent
Iwamoto et al.

(10) Patent No.: US 8,765,850 B2
(45) Date of Patent: Jul. 1, 2014

(54) POLYACETAL RESIN COMPOSITION AND PREPARATION PROCESS THEREOF

(75) Inventors: Takashi Iwamoto, Tokyo (JP); Yukiyoshi Sasaki, Tokyo (JP); Mitsuhiro Horio, Tokyo (JP); Syuuichi Kudou, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 334 days.

(21) Appl. No.: 12/921,182

(22) PCT Filed: Oct. 27, 2009

(86) PCT No.: PCT/JP2009/005670
§ 371 (c)(1),
(2), (4) Date: Sep. 7, 2010

(87) PCT Pub. No.: WO2010/050187
PCT Pub. Date: May 6, 2010

(65) Prior Publication Data
US 2011/0015321 A1 Jan. 20, 2011

(30) Foreign Application Priority Data
Oct. 28, 2008 (JP) ................................. 2008-277280
Dec. 3, 2008 (JP) ................................. 2008-308490
Feb. 25, 2009 (JP) ................................. 2009-042189

(51) Int. Cl.
C08L 59/00 (2006.01)
C08L 59/02 (2006.01)
C08K 5/25 (2006.01)

(52) U.S. Cl.
USPC ............................. 524/192; 524/227; 524/593

(58) Field of Classification Search
USPC .......................................... 524/192, 227, 593
See application file for complete search history.

(56) References Cited

U.S. PATENT DOCUMENTS

| 3,027,352 A | 3/1962 | Walling et al. |
| 3,803,094 A | 4/1974 | Ishii et al. |
| 4,087,411 A | 5/1978 | Sugio et al. |

(Continued)

FOREIGN PATENT DOCUMENTS

| DE | 1161421 | 1/1964 |
| DE | 1495228 | 2/1969 |

(Continued)

OTHER PUBLICATIONS

JP 2005263927 A, 09-2-5, English Ab.*

(Continued)

Primary Examiner — Satya Sastri
(74) Attorney, Agent, or Firm — Greenblum & Bernstein, P.L.C.

(57) ABSTRACT

Provided is a polyacetal resin composition obtained from a raw material composition containing a polyacetal resin, a hydrazine derivative, and a compound for lowering the melting point of the hydrazine derivative, wherein a mixture of the hydrazine derivative and the compound satisfies both of the following conditions: T1<T2 and T1<T3, in which T1 is an apex temperature of an endothermic peak of the mixture having a maximum endothermic capacity by, with DSC, heating and cooling the mixture in accordance with a predetermined temperature program and then heating it at a predetermined rate until the mixture fuses; and T2 and T3 represent apex temperatures of endothermic peaks of the hydrazine derivative and the polyacetal resin having a maximum endothermic capacity, respectively by the similar treatment.

22 Claims, 5 Drawing Sheets

(56) References Cited

U.S. PATENT DOCUMENTS

| | | | |
|---|---|---|---|
| 4,431,794 | A | 2/1984 | Sadlowski et al. |
| 7,816,433 | B2 | 10/2010 | Komatsu et al. |
| 7,893,140 | B2 | 2/2011 | Hase |
| 2006/0052492 | A1 | 3/2006 | Harashina |
| 2006/0063863 | A1* | 3/2006 | Sunaga et al. ............... 524/100 |
| 2007/0032605 | A1 | 2/2007 | Harashina |
| 2007/0054998 | A1 | 3/2007 | Harashina |
| 2007/0073007 | A1 | 3/2007 | Harashina |
| 2007/0078204 | A1 | 4/2007 | Komatsu et al. |
| 2007/0129484 | A1 | 6/2007 | Horio et al. |
| 2009/0062503 | A1 | 3/2009 | Nagai et al. |
| 2009/0143506 | A1 | 6/2009 | Harashina |
| 2009/0234050 | A1 | 9/2009 | Wada et al. |
| 2009/0312466 | A1 | 12/2009 | Hase |

FOREIGN PATENT DOCUMENTS

| | | |
|---|---|---|
| DE | 1720358 | 4/1972 |
| DE | 3018898 | 11/1980 |
| EP | 1637557 | 3/2006 |
| EP | 1 683 838 | 7/2006 |
| EP | 1 686 156 | 8/2006 |
| EP | 1 688 461 | 8/2006 |
| EP | 1 876 193 | 1/2008 |
| EP | 2036949 | 3/2009 |
| EP | 2123709 | 11/2009 |
| JP | 55-042085 | 10/1980 |
| JP | 58-098322 | 6/1983 |
| JP | 04-345648 | 12/1992 |
| JP | 07-070267 | 3/1995 |
| JP | 10-298401 | 11/1998 |
| JP | 2005263927 A * | 9/2005 |
| JP | 2005-306944 | 11/2005 |
| JP | 2005-325225 | 11/2005 |
| JP | 2005-336304 | 12/2005 |
| JP | 2006-045489 | 2/2006 |
| JP | 2006-111874 | 4/2006 |
| JP | 2006-306944 | 11/2006 |
| JP | 2007-051205 | 3/2007 |
| JP | 2007-091973 | 4/2007 |
| JP | 2008-007676 | 1/2008 |
| JP | 2000-119357 | 4/2011 |
| WO | 2005/033200 | 4/2005 |
| WO | 2005/040275 | 5/2005 |
| WO | 2008/078570 | 7/2008 |

OTHER PUBLICATIONS

Japanese Office Action issued with respect to Japanese Patent Application No. JP 2009-246854, mailed Feb. 9, 2011, along with an English language translation.

Japanese Office Action issued with respect to Japanese Patent Application No. JP 2009-246856, mailed Feb. 9, 2011, along with an English language translation.

Japanese Office Action issued with respect to Japanese Patent Application No. JP 2009-246858, mailed Feb. 9, 2011, along with an English language translation.

Supplementary European Search Report issued with respect to European Patent Application No. EP 09823300.0, dated Apr. 15, 2011.

Japanese Inquiry issued with respect to counterpart Japanese Application No. 2009-246854, dated Oct. 29, 2012.

Japanese Inquiry issued with respect to counterpart Japanese Application No. 2009-246856, dated Oct. 29, 2012.

Japanese Inquiry issued with respect to counterpart Japanese Application No. 2009-246858, dated Oct. 29, 2012.

International Preliminary Report on Patentability for PCT/JP2009/005670, mailed Jun. 7, 2011.

Japan Office action that issued with respect to patent family member Japanese Patent Application No. 2009-246854, mail date is Jun. 10, 2011.

Japan Office action that issued with respect to patent family member Japanese Patent Application No. 2009-246856, mail date is Jun. 10, 2011.

Japan Office action that issued with respect to patent family member Japanese Patent Application No. 2009-246858, mail date is Jun. 10, 2011.

International Search Report for PCT/JP2009/005670, mailed Feb. 2, 2010.

* cited by examiner

POLYACETAL RESIN COMPOSITION AND PREPARATION PROCESS THEREOF

TECHNICAL FIELD

The present invention relates to a polyacetal resin composition and a preparation process thereof.

BACKGROUND ART

Polyacetal resins are well-balanced among mechanical strength, chemical resistance, and excellent frictional wear properties and at the same time, they can be processed easily. As typical engineering plastics, polyacetal resins are used over a wide range of applications mainly for electrical appliances, mechanism parts for electrical appliances, automotive parts, and other mechanism parts. With expansion of application fields, however, polyacetal resins are required to reduce generation of formaldehyde, have dimensional stability after aging, have hot water resistance, reduce an amount of mold deposit, reduce an amount of formaldehyde generated after sliding, and suppress crack generation under aging. Thus, there is an increasing demand for polyacetal resins having various properties at a higher level.

With a view to satisfying such requirements, particularly with a view to satisfying the requirement for reducing generation of formaldehyde, there are investigated a process of adding guanamine and a hydrazide compound to a polyacetal resin composition (refer to, for example, Patent Documents 1 and 5), a process of adding a carboxylic acid hydrazide compound (refer to, for example, Patent Documents 2, 3, and 4), a process of adding a hydrazide compound (refer to, for example, Patent Document 6 and 7), and a method of adding an aromatic dihydrazide compound and an aliphatic hydrazide compound (refer to, for example, Patent Document 8).

[Patent Document 1] Japanese Patent Application Laid-open No. 2008-7676
[Patent Document 2] Japanese Patent Application Laid-open No. 4-345648
[Patent Document 3] Japanese Patent Application Laid-open No. 10-298401
[Patent Document 4] Japanese Patent Application Laid-open No. 2007-91973
[Patent Document 5] Japanese Patent Application Laid-open No. 2007-51205
[Patent Document 6] Japanese Patent Application Laid-open No. 2006-306944
[Patent Document 7] Japanese Patent Application Laid-open No. 2006-45489
[Patent Document 8] Japanese Patent Application Laid-open No. 2005-325225

SUMMARY OF THE INVENTION

Problems to be Solved by the Invention

In the above-described polyacetal resin compositions containing a compound generally called "formaldehyde catcher", the compound adversely affects the crystallization state of the polyacetal. As a result, molded or formed products of these polyacetal resin compositions have various problems to be overcome such as unstable repeated impact resistance after aging and generation of cracks under aging as well as lack of dimensional stability, an unstable amount of formaldehyde emission upon recycling, and an unstable amount of formaldehyde generated after sliding. In addition, in such polyacetal resin compositions, there is a room for improvement in the hot water resistance and reducing mold deposit under the condition of a low resin filling rate in a mold.

With the foregoing in view, the present invention has been made. A first object of the present invention is to provide a polyacetal resin composition excellent in dimensional stability after aging, repeated impact resistance after aging, moldability or formability of recycled products, that is, a reduction in the amount of formaldehyde emission upon recycling, and a reduction in the amount of mold deposit under the condition of a low resin filling rate in a mold.

A second object of the present invention is to provide a polyacetal resin composition that generates a reduced amount of formaldehyde after sliding, suppresses crack generation under aging, and reduces mold deposit under the condition of a low resin filling rate in a mold.

A third object of the present invention is to provide a preparation process of a polyacetal resin composition particularly excellent in repeated impact resistance after aging and recycling moldability or formability, that is, a reduction in the amount of formaldehyde emission upon recycling.

Means for Solving the Problems

The present inventors have carried out an intensive investigation in order to achieve the above-described objects. As a result, it has been found that the first object can be achieved by a polyacetal resin composition containing a polyacetal resin, a hydrazine derivative, and a compound for lowering the melting point of the hydrazine derivative, leading to the completion of the present invention.

The present inventors have also found that the second object can be achieved by a polyacetal resin composition obtained from a resin material composition containing a polyacetal resin, a hydrazine derivative, a compound for lowering the melting point of the hydrazine derivative, and a polyalkylene glycol, leading to the completion of the present invention.

The present inventors have further found that the third object can be achieved by preparing, through predetermined steps, a polyacetal resin composition obtained from a resin composition containing a polyacetal resin, a first hydrazine derivative, and a compound for lowering the melting point of the first hydrazine derivative, leading to the completion of the present invention.

The present invention is as follows:

[1] A polyacetal resin composition obtained from a raw material composition containing a polyacetal resin, a first hydrazine derivative, and a compound for lowering the melting point of the first hydrazine derivative, wherein:
a mixture of the first hydrazine derivative and the compound for lowering the melting point of the first hydrazine derivative satisfies the conditions represented by the following formulas (1) and (2):

$$T1<T2 \quad (1)$$

$$T1<T3 \quad (2)$$

(in the formulas (1) and (2), T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min).

[2] The polyacetal resin composition as described above in [1], wherein the raw material composition further contains a polyalkylene glycol in an amount of from 2 to 20 times the mass of a mixture of the first hydrazine derivative and the compound for lowering the melting point of the first hydrazine derivative.

[3] The polyacetal resin composition as described above in [2], wherein the polyalkylene glycol has a number average molecular weight of from 300 to 10000.

[4] The polyacetal resin composition as described above in [2] or [3], wherein the polyalkylene glycol is polyethylene glycol.

[5] A polyacetal resin composition obtained from a raw material composition containing a polyacetal resin, a first hydrazine derivative, and a compound for lowering the melting point of the first hydrazine derivative; wherein a mixture of the first hydrazine derivative and the compound for lowering the melting point of the first hydrazine derivative satisfies the conditions represented by the following formulas (1) and (2):

$$T1 < T2 \quad (1)$$

$$T1 < T3 \quad (2)$$

(in the formulas (1) and (2), T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min); and a molding of the polyacetal resin composition has a tensile elongation retention of 50% or greater after subjected to a predetermined hot water resistance test.

[6] The polyacetal resin composition as described above in any one of [1] to [5], wherein the compound for lowering the melting point of the first hydrazine derivative is one or more second hydrazine derivatives different from the first hydrazine derivative.

[7] The polyacetal resin composition as described above in any one of [1] to [6], wherein the first hydrazine derivative is a carboxylic acid hydrazide and the compound for lowering the melting point of the first hydrazine derivative is one or more carboxylic acid hydrazides different from the first hydrazine derivative.

[8] The polyacetal resin composition as described above in any one of [1] to [7], wherein the first hydrazine derivative is a carboxylic acid dihydrazide represented by the following formula (3):

(in the formula (3), $R_1$ represents a substituted or unsubstituted divalent hydrocarbon group) and the compound for lowering the melting point of the first hydrazine derivative is one or more carboxylic acid hydrazides different from the first hydrazine derivative.

The polyacetal resin composition as described above in any one of [1] to [8], wherein the first hydrazine derivative is one or more carboxylic acid dihydrazides selected from the group consisting of adipic acid dihydrazide, sebacic acid dihydrazide, and dodecanedioic acid dihydrazide.

The polyacetal resin composition as described above in any one of [1] to [9], wherein the first hydrazine derivative and the compound for lowering the melting point of the first hydrazine derivative respectively contain carboxylic acid dihydrazides selected from the group consisting of adipic acid dihydrazide, sebacic acid dihydrazide, and dodecanedioic acid dihydrazide but different from each other.

The polyacetal resin composition as described above in any one of [1] to [10], wherein a total content of the first hydrazine derivative and the compound for lowering the melting point of the first hydrazine derivative is from 0.03 to 0.2 part by mass based on 100 parts by mass of the polyacetal resin.

The polyacetal resin composition as described above in any one of [1] to [11], wherein a content ratio of the first hydrazine derivative to the compound for lowering the melting point of the first hydrazine derivative is from 2:8 to 8:2 by mass.

The polyacetal resin composition as described above in any one of [1] to [12], wherein a content ratio of the first hydrazine derivative to the compound for lowering the melting point of the first hydrazine derivative is from 3:7 to 7:3 by mass.

The polyacetal resin composition as described above in any one of [1] to [13], wherein a peak area of an endothermic peak of a 1:1 (mass ratio) mixture of the first hydrazine derivative and the compound for lowering the melting point of the first hydrazine derivative having a maximum endothermic capacity is less than 95% of a total peak area of all the endothermic peaks of the mixture.

The polyacetal resin composition as described above in any one of [1] to [14], wherein the polyacetal resin is a polyacetal copolymer.

The polyacetal resin composition as described above in any one of [1] to [15], wherein the polyacetal resin is a polyacetal copolymer obtained by chain transfer reaction with methylal.

[17] A molded or formed product for automotive interior or mechanism containing the polyacetal composition resin as described above in any one of [1] to [16].

[18] The molded or formed product for automotive interior or mechanism as described above in [17], selected from the group consisting of doors, sunroofs, sheet belts, switches, clips, sheets, and wipers.

[19] A process for preparing a polyacetal resin composition obtained from a raw material composition containing a polyacetal resin, a first hydrazine derivative, and a compound for lowering the melting point of the first hydrazine derivative, including a first step of preparing a mixture of the first hydrazine derivative and the compound for lowering the melting point of the first hydrazine derivative, the mixture satisfying the conditions represented by the following formulas (1) and (2):

$$T1<T2 \quad (1)$$

$$T1<T3 \quad (2)$$

(in the formulas (1) and (2), T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min); and a second step of melting and kneading the mixture obtained through the first step with the polyacetal resin.

[20] The preparation process of a polyacetal resin composition as described above in [19], further comprising a third step of melting the mixture obtained through the first step, wherein the molten mixture obtained through the third step is supplied to the second step.

[21] A process for preparing a polyacetal resin composition obtained from a raw material composition containing a polyacetal resin, a first hydrazine derivative, and a compound for lowering the melting point of the first hydrazine derivative, including a first step of mixing the first hydrazine derivative, the compound for lowering the melting point of the first hydrazine derivative, and a portion of the polyacetal resin to obtain a pre-mixture; and a second step of melting and kneading the pre-mixture obtained through the first step with a remaining portion of the polyacetal resin, wherein:

the mixture of the first hydrazine derivative and the compound for lowering the melting point of the first hydrazine derivative satisfies the conditions represented by the following formulas (1) and (2):

$$T1<T2 \quad (1)$$

$$T1<T3 \quad (2)$$

(in the formulas (1) and (2), T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min).

[22] The preparation process of a polyacetal resin composition as described above in [21], further comprising a third step of melting the pre-mixture obtained through the first step, wherein the molten pre-mixture obtained through the third step is supplied to the second step.

[23] The preparation process of a polyacetal resin composition as described above in any one of [19] to [22], wherein the compound for lowering the melting point of the first hydrazine derivative is one or more second hydrazine derivatives different from the first hydrazine derivative.

[24] The preparation process of a polyacetal resin composition as described above in any one of [19] to [23], wherein the first hydrazine derivative is a carboxylic acid hydrazide and the compound for lowering the melting point of the first hydrazine derivative is one or more carboxylic acid hydrazides different from the first hydrazine derivative.

[25] The preparation process of a polyacetal resin composition as described above in any one of [19] to [24], wherein the first hydrazine derivative is a carboxylic acid dihydrazide represented by the following formula (3):

(in the formula (3), $R_1$ represents a substituted or unsubstituted divalent hydrocarbon group) and the compound for lowering the melting point of the first hydrazine derivative is one or more carboxylic acid hydrazides different from the first hydrazine derivative.

[26] The preparation process of a polyacetal resin composition as described above in any one of [19] to [25], wherein the first hydrazine derivative is one or more carboxylic acid dihydrazides selected from the group consisting of adipic acid dihydrazide, sebacic acid dihydrazide, and dodecanedioic acid dihydrazide.

[27] The preparation process of a polyacetal resin composition as described above in any one of [19] to [26], wherein the first hydrazine derivative and the compound for lowering the melting point of the first hydrazine derivative respectively contain carboxylic acid dihydrazides selected from the group consisting of adipic acid dihydrazide, sebacic acid dihydrazide, and dodecanedioic acid dihydrazide but different from each other.

[28] The preparation process of a polyacetal resin composition as described above in any one of [19] to [27], wherein a total content of the first hydrazine derivative and the compound for lowering the melting point of the first hydrazine derivative is from 0.03 to 0.2 part by mass based on 100 parts by mass of the polyacetal resin.

[29] The preparation process of a polyacetal resin composition as described above in any one of [19] to [28], wherein a content ratio of the first hydrazine derivative to the compound for lowering the melting point of the first hydrazine derivative is from 2:8 to 8:2 by mass.

[30] The preparation process of a polyacetal resin composition as described above in any one of [19] to [29], wherein a content ratio of the first hydrazine derivative to the compound for lowering the melting point of the first hydrazine derivative is from 3:7 to 7:3 by mass.

[31] The preparation process of a polyacetal resin composition as described above in any one of [19] to [30], wherein a peak area of an endothermic peak of a 1:1 (mass ratio) mixture of the first hydrazine derivative and the compound for lowering the melting point of the first hydrazine derivative having a maximum endothermic capacity is less than 95% of a total peak area of all the endothermic peaks of the mixture.

[32] The preparation process of a polyacetal resin composition as described above in any one of [19] to [31], wherein the polyacetal resin is a polyacetal copolymer.

[33] The preparation process of a polyacetal resin composition as described above in any one of [19] to [32], wherein the polyacetal resin is a polyacetal copolymer containing one or more comonomers selected from the group consisting of ethylene oxide, propylene oxide, epichlorohydrin, 1,3-dioxolane, and 1,4-butanediol formal in an amount of from 0.0013 to 0.0039 mol per mol of trioxane.

Effect Of The Invention

The present invention can provide a polyacetal resin composition excellent in dimensional stability after aging, repeated impact resistance after aging, recycling moldability or formability, that is, stability of an amount of formaldehyde emission upon recycling, and reducing mold deposit under the condition of a low resin filling rate in a mold.

The present invention can also provide a polyacetal resin composition that generates a reduced amount of formaldehyde after sliding, suppresses crack generation under aging, and reduces mold deposit under the condition of a low resin filling rate in a mold.

The present invention can further provide a preparation process of a polyacetal resin composition particularly excellent in repeated impact resistance after aging and recycling moldability or formability, that is, stability of an amount of formaldehyde emission upon recycling.

MODE FOR CARRYING OUT THE INVENTION

Figure 1:
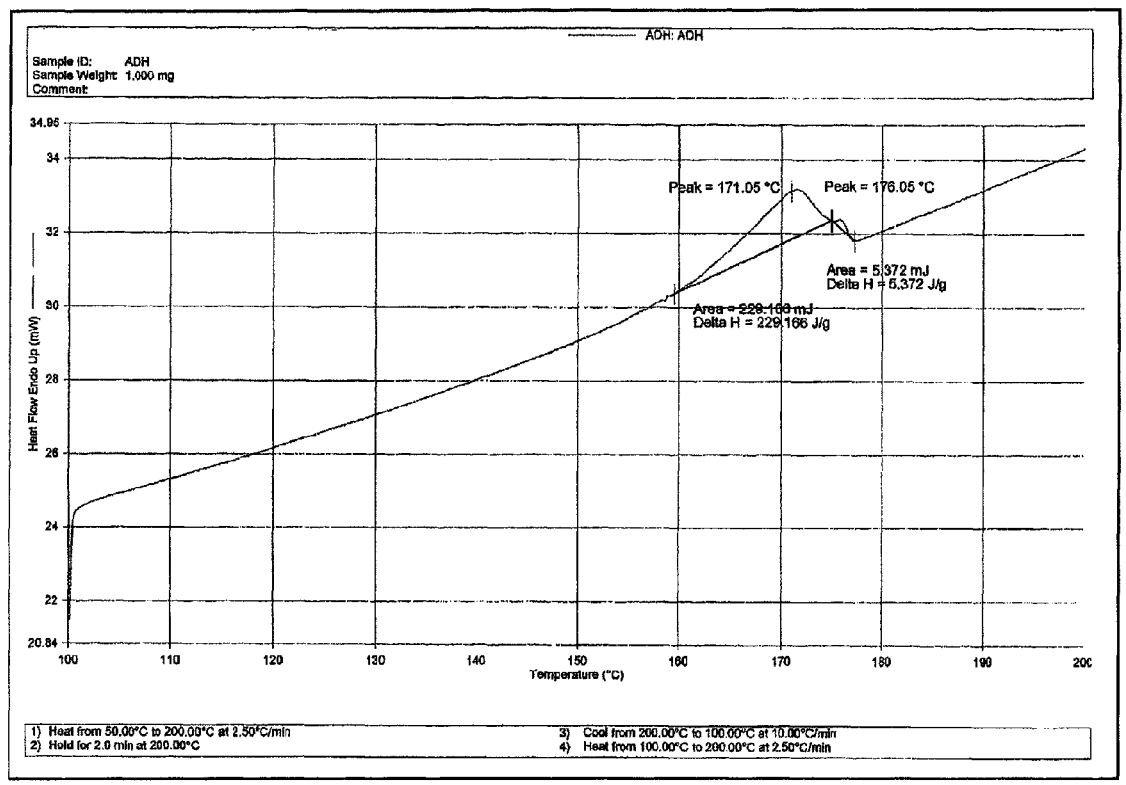
FIG. 1 is a chart showing the results of differential scanning calorimetry of adipic acid dihydrazide.

Modes for carrying out the present invention (which will hereinafter be called "embodiments") will hereinafter be described in detail referring to drawings as needed. In these drawings, the positional relationship such as left, right, top, or bottom is based on the positional relationship in the drawing unless otherwise specifically stated. The present invention is not limited to the following embodiments but can be modified without departing from the scope of the invention.

First, a description will be given of a first embodiment. The polyacetal resin composition according to the first embodiment is a polyacetal resin composition obtained from a raw material composition containing a polyacetal resin (A), a hydrazine derivative (B), and a compound (C) for lowering the melting point of the hydrazine derivative (B), wherein a mixture of the hydrazine derivative (B) and the compound (C) for lowering the melting point of the hydrazine derivative (B) satisfies the conditions represented by the following formulas (1) and (2). The term "raw material composition" as used in this embodiment means a composition containing the above-described three components and the polyacetal resin composition of the present embodiment can be obtained by subjecting the raw material composition to some treatments (for example, mixing, melting, and kneading). It is however to be noted that the polyacetal resin composition obtained by some treatments preferably remains to contain the three components.

$$T1 < T2 \quad (1)$$

$$T1 < T3 \quad (2)$$

In the formulas (1) and (2), T1 is a temperature (° C.) showing an apex of an endothermic peak of the mixture, that is, the mixture of the hydrazine derivative (B) and the compound (C) for lowering the melting point of the hydrazine derivative, having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the hydrazine derivative having a maximum endothermic capacity, among endothermic peaks obtained by, with the differential scanning calorimeter, heating and cooling the hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min.

The term "predetermined temperature program" described above means a temperature program in which heating is conducted from a temperature lower than the endothermic peak of the mixture, the hydrazine derivative (B), or the polyacetal resin (A) to a fusing temperature of the mixture at a rate of 2.5° C./min, the temperature is kept for 2 minutes, and then cooling is conducted at a cooling rate of 10° C./min to 100° C.

[Polyacetal Resin (A)]

The polyacetal resin (A) is not particularly limited insofar as it is conventionally known ones and examples include polyacetal homopolymers and polyacetal copolymers. The polyacetal homopolymers are, for example, those composed substantially only of oxymethylene units obtained by homopolymerization of a formaldehyde monomer or a cyclic oligomer of formaldehyde, such as formaldehyde trimer (trioxane) or formaldehyde tetramer (tetraoxane). Examples of the polyacetal copolymer include those obtained by copolymerization of a formaldehyde monomer or a cyclic oligomer of formaldehyde such as formaldehyde trimer (trioxane) or formaldehyde tetramer (tetraoxane) with one or more comonomers selected from the group consisting of ethylene oxide, propylene oxide, epichlorohydrin, 1,3-dioxolane, and 1,4-butanediol formal. Examples of the polyacetal copolymer also include branched polyacetal copolymers obtained by copolymerizing a formaldehyde monomer or the cyclic oligomer of formaldehyde with monofunctional glycidyl ether and polyacetal copolymers having a crosslinked structure obtained by copolymerizing a formaldehyde monomer or the cyclic oligomer of formaldehyde with polyfunctional glycidyl ether.

Examples of the polyacetal resin (A) further include polyacetal homopolymers having a block component obtained by polymerizing a formaldehyde monomer or the cyclic oligomer of formaldehyde in the presence of a compound, for example, a polyalkylene glycol, having one or both ends thereof a functional group such as hydroxyl group; and also polyacetal copolymers having a block component obtained by copolymerizing a formaldehyde monomer or the cyclic oligomer of formaldehyde with a cyclic ether or cyclic formal in the presence of a compound, for example, hydrogenated polybutadiene glycol, having at one or both ends thereof a functional group such as hydroxyl group. As the polyacetal resin (A), both of the polyacetal homopolymer and the polyacetal copolymer can be used as described above. Of these polyacetals, the polyacetal copolymer is preferred from the standpoint of balance between thermal stability and mechanical properties. As the polyacetal resin (A), the above-described ones may be used either singly or in combination.

When the polyacetal copolymer is composed of trioxane and the above-described comonomer such as 1,3-dioxolane, copolymerization is performed while using the comonomer in an amount of from 0.001 to 0.6 mol per mol of trioxane from the standpoint of improving thermal stability. The amount of the comonomer is more preferably from 0.001 to 0.2 mol, still more preferably from 0.013 to 0.1 mol.

Although no particular limitation is imposed on a polymerization catalyst to be used for copolymerization for obtaining the polyacetal copolymer, cation active catalysts such as Lewis acids, protonic acids, and esters or anhydrides of protonic acids are preferred. Examples of the Lewis acids include halides of boric acid, tin, titanium, phosphorus, arsenic, or antimony. More specific examples include boron trifluoride, tin tetrachloride, titanium tetrachloride, phosphorus pentafluoride, phosphorus pentachloride, and antimony pentafluoride, and complex compounds or salts thereof. The Lewis acids are however not limited to them. Specific examples of the protonic acids or esters or anhydrides thereof include, but not limited to, perchloric acid, trifluoromethane sulfonic acid, tertiary butyl ester of perchloric acid, acetyl perchlorite, and trimethyloxonium hexafluorophosphate. Of these cation active catalysts, boron trifluoride, boron trifluoride hydrate, and coordinated complex compounds of an oxygen- or sulfur-containing organic compound with boron trifluoride are preferred. As such a cation active catalyst, boron trifluoride diethyl ether, boron trifluoride di-n-butyl ether, and boron trifluoride di-n-butyl etherate are preferred from the standpoint of improving a polymerization yield. In addition to the cation active catalyst, a polymerization chain agent (chain transfer agent) such as methylal may be used as needed in order to obtain the polyacetal copolymer. When methylal is used, that having a water content of 100 ppm or less and a methanol content of 1 mass % or less is preferred, with that having a water content of 50 ppm or less and a methanol content of 0.7 mass % or less being more preferred.

No particular limitation is imposed on the polymerization process of a polyacetal copolymer and conventionally known processes can be used. Examples include those described in U.S. Pat. No. 3,027,352, U.S. Pat. No. 3,803,094, German Patent No. 1161421, German Patent No. 1495228, German Patent No. 1720358, German Patent No. 3018898, Japanese Patent Application Laid-open No. 58-898322, and Japanese Patent Application Laid-open No. 7-70267. Japanese Patent Publication No. 55-42085 proposes a trivalent phosphorus compound as a catalyst deactivator not requiring washing/removal, but removal of an unstable terminal group becomes necessary to obtain a polyacetal copolymer having higher thermal stability.

The polyacetal copolymer obtained by the above polymerization has a thermally unstable terminal group (—(OCH$_2$)$_n$—OH group) so that specific decomposition and removal treatment of the unstable terminal group which will be described below is preferably conducted in order to improve the practical use of the copolymer.

The term "specific decomposition and removal treatment of the unstable terminal portion (which will hereinafter be called "removal treatment of the unstable terminal group") means a method of heat treating the polyacetal copolymer at a temperature of the melting point of the polyacetal copolymer or greater but not greater than 260° C. in the presence of at least one quaternary ammonium compound represented by the following formula (7), while melting the polyacetal copolymer.

$$[R^1R^2R^3R^4N^+]_nX^{n-} \qquad (7)$$

wherein, in the formula (7), $R^1$, $R^2$, $R^3$, and $R^4$ each independently represents an substituted or unsubstituted alkyl group having from 1 to 30 carbon atoms, an aryl group having from 6 to 20 carbon atoms, an aralkyl group obtained by substituting at least one hydrogen atom of a substituted or unsubstituted alkyl group having from 1 to 30 carbon atoms with an aryl group having from 6 to 20 carbon atoms, or an alkylaryl group obtained by substituting at least one hydrogen atom of an aryl group having from 60 to 20 carbon atoms with a substituted or unsubstituted alkyl group having from 1 to 30 carbon atoms, provided that the substituted or unsubstituted alkyl group may be any of linear, branched, or cyclic. The substituent of the substituted alkyl group is a halogen atom, a hydroxyl group, an aldehyde group, a carboxyl group, an amino group, or an amide group. The unsubstituted alkyl group, aryl group, aralkyl group, or alkylaryl group may have a hydrogen atom may be substituted with a halogen atom. In the above formula, n represents an integer from 1 to 3; and X represents a hydroxyl group or an acid residue of a carboxylic acid having from 1 to 20 carbon atoms, a hydroacid other than hydrogen halides, an oxo acid, an inorganic thio acid, or an organic thio acid having from 1 to 20 carbon atoms.

The quaternary ammonium compound is not particularly limited insofar as it is represented by the above formula (7). It is preferred that $R^1$, $R^2$, $R^3$, and $R^4$ in the formula (7) each independently represents an alkyl group having from 1 to 5 carbon atoms or a hydroxyalkyl group having from 2 to 4 carbon atoms; more preferred that at least one of $R^1$, $R^2$, $R^3$, and $R^4$ is a hydroxyethyl group. Specific examples include hydroxides ($X^{n-}$=OH$^-$) of tetramethylammonium, tetraethylammonium, tetrapropylammonium, tetra-n-butylammonium, cetyltrimethylammonium, tetradecyltrimethylammonium, 1,6-hexamethylene-bis(trimethylammonium), decamethylene-bis(trimethylammonium), trimethyl-3-chloro-2-hydroxypropylammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium, or tetrakis(hydroxyethyl)ammonium; salts of a hydroacid such as hydrochloric acid, hydrobromic acid or hydrofluoric acid; salts of an oxo-acid such as sulfuric acid ($X^{n-}$=HSO$_4^-$, SO$_4^{2-}$), nitric acid, phosphoric acid, carbonic acid ($X^{n-}$=HCO$_3^-$, CO$_3^{2-}$), boric acid ($X^{n-}$=B(OH)$_4^-$), chloric acid, iodic acid, silicic acid, perchloric acid, chlorous acid, hypochlorous acid, chlorosulfuric acid, amidosulfuric acid, disulfuric acid or tripolyphosphoric acid; salts of a thio acid such as thiosulfuric acid; and salts of a carboxylic acid such as formic acid, acetic acid, propionic acid, butanoic acid, isobutyric acid, pentanoic acid, caproic acid, caprylic acid, capric acid, benzoic acid, or oxalic acid. Of these, hydroxides, sulfates, carbonates, borates, and carboxylates are preferred. Of the carboxylates, formats, acetates and propionates are particularly preferred. Such a quaternary ammonium compound is, for example, a choline formate hydroxide (such as trimethyl-2-hydroxyethylammonium formate and triethyl-2-hydroxyethylammonium formate). These quaternary ammonium compounds may be used either singly or in combination. The quaternary ammonium compound may be used in combination with a known decomposition accelerator for an unstable terminal group such as an amine, e.g., ammonia or triethylamine.

An amount of the quaternary ammonium compound to be used in the heat treatment is preferably from 0.05 to 50 ppm by mass, more preferably from 1 to 30 ppm by mass in terms of an amount of nitrogen originating from the quaternary ammonium compound represented by the following formula (8) based on the total mass of the polyacetal copolymer and the quaternary ammonium compound.

$$P \times 14/Q \quad (8)$$

wherein in the formula (8), P represents the concentration (ppm by mass) of the quaternary ammonium compound relative to the polyacetal copolymer, "14" is the atomic weight of nitrogen, and Q represents the molecular weight of the quaternary ammonium compound.

When the amount of the quaternary ammonium compound added is less than 0.05 ppm by mass in terms of the amount of nitrogen originating from the quaternary ammonium compound, the decomposition and removal rate of the unstable terminal group tends to decrease. When it exceeds 50 ppm by mass, on the other hand, the color tone of the polyacetal copolymer after removal treatment of the unstable terminal group tends to be deteriorated.

The removal treatment of the unstable terminal group from the polyacetal copolymer is achieved by heat treating the polyacetal copolymer at a temperature of the melting point of the polyacetal copolymer or greater but not greater than 260° C., while melting it. No particular limitation is imposed on an apparatus to be used for the heat treatment, heat treatment with an extruder, kneader, or the like is preferred. Formaldehyde generated upon decomposition is removed under reduced pressure. A method of adding the quaternary ammonium compound is not particularly limited and examples of it include a method of adding it as an aqueous solution in a step of deactivating the polymerization catalyst and a method of spraying it to a polyacetal copolymer powder produced by polymerization. Either method is usable insofar as it is added during the heat treatment step of the polyacetal copolymer. It may be poured in an extruder. When a filler or pigment is incorporated in the polyacetal resin composition by using an extruder or the like, resin pellets may be impregnated with the quaternary ammonium compound, followed by removal of the unstable terminal group in a mixing step which will be conducted later.

The removal treatment of the unstable terminal group may be performed after deactivation of the polymerization catalyst in the polyacetal copolymer obtained by polymerization or without deactivating the catalyst. Although no particular limitation is imposed on the deactivation treatment of the polymerization catalyst, a typical example of it includes a method of neutralizing and thereby deactivating the polymerization catalyst in an aqueous basic solution such as amine. It is also effective to heat the polyacetal copolymer at a temperature not greater than the melting point of the polyacetal copolymer in an inert gas atmosphere and reduce the polymerization catalyst by evaporation, thereby carrying out the removal treatment of the unstable terminal group without deactivating the polymerization catalyst.

The removal treatment of the unstable terminal group enables to yield a polyacetal resin that generates formaldehyde in an amount not greater than 100 ppm relative to the amount of the polyacetal resin when heated at 200° C. for 50 minutes in a nitrogen atmosphere.

[Hydrazine Derivative (B)]

No particular limitation is imposed on the hydrazine derivative (B) of the present embodiment insofar as it has a hydrazine structure (N—N), that is, a structure having a single bond between nitrogen atoms. Examples include hydrazine; hydrazine hydrate; carboxylic acid monohydrazides such as succinic monohydrazide, glutaric acid monohydrazide, adipic acid monohydrazide, pimelic acid monohydrazide, suberic acid monohydrazide, azelaic acid monohydrazide, and sebacic acid monohydrazide; saturated aliphatic carboxylic acid dihydrazides such as oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, and dodecanedioic acid dihydrazide; monoolefinic unsaturated dicarboxylic acid dihydrazides such as maleic acid dihydrazide, fumaric acid dihydrazide, and itaconic acid dihydrazide; aromatic carboxylic acid dihydrazides such as isophthalic acid dihydrazide, phthalic acid dihydrazide, and 2,6-naphthalene dicarbodihydrazide; pyromellitic acid dihydrazide; trihydrazides such as trimeric acid trihydrazide, cyclohexanetricarboxylic acid trihydrazide, benzenetricarboxylic acid trihydrazide, nitrotriacetic acid trihydrazide, and citric acid trihydrazide; tetrahydrazides such as pyromellitic acid tetrahydrazide, naphthoeic acid tetrahydrazide, ethylenediaminetetraacetic acid tetrahydrazide, and 1,4,5,8-naphthoeic acid tetrahydrazide; polyhydrazides such as polyhydrazide obtained by reacting a low polymer having a lower alkyl ester group of a carboxylic acid with hydrazine or a hydrazine hydrate; carbonic acid dihydrazide; bissemicarbazide; polyfunctional semicarbazides obtained by reacting a diisocyanate such as hexamethylene diisocyanate or isophorone diisocyanate or a polyisocyanate compound derived therefrom with excess of N,N-substituted hydrazine such as N,N-dimethylhydrazine and/or the above-exemplified hydrazide; aqueous polyfunctional semicarbazides obtained by reacting an isocyanate group in a reaction product between the above polyisocyanate compound and an active hydrogen compound containing a hydrophilic group such as a polyether polyol or a polyethylene glycol monoalkyl ether with excess of any of the above dihydrazides; mixtures of the above polyfunctional semicarbazide with the above aqueous polyfunctional semicarbazide; and bisacetyl dihydrazone.

[Compound (C) for Lowering the Melting Point of the Hydrazine Derivative (B)]

As a result of investigation on various hydrazine derivatives (B), the present inventors have found that a compound having, in the molecule thereof, a plurality of hydrazide groups is effective for an efficient reaction between the hydrazine derivative (B) and formaldehyde, but the melting point of the hydrazine derivative (B) itself tends to increase and exceeds the melting point of the polyacetal resin (A). They have also found that an increase in the difference between the melting point of the polyacetal resin (A) and the melting point of the hydrazine derivative (B) is likely to cause mold deposit.

The present inventors have therefore paid attention to a compound for lowering the melting point of the hydrazine derivative (B).

No particular limitation is imposed on the compound (C) for lowering the melting point of the hydrazine derivative (B) insofar as it can lower the melting point of the hydrazine derivative (B) when added thereto. As the compound (C), one or more hydrazine derivatives different from the hydrazine derivative (B) are preferred. When, for example, the hydrazine derivative (B) is a monohydrazide, one or more hydrazides and/or dihydrazides different from the hydrazine derivative (B) are more preferred as the compound (C). When the hydrazine derivative (B) is a dihydrazide, one or more dihydrazides and/or monohydrazides different from the hydrazine derivative (B) are more preferred as the compound (C). Thus, use of a hydrazine derivative as the compound (C) and use of, as a combination of the hydrazine derivative (B) and the compound (C), that of hydrazide derivatives having different structures, respectively, are effective for lowering the melting point of the hydrazine derivative (B).

The combination of the hydrazine derivative (B) and the compound (C) is preferably a combination of dihydrazide compounds, more preferably a combination of saturated aliphatic carboxylic acid dihydrazide compounds. This means that when a saturated aliphatic carboxylic acid dihydrazide is used as the hydrazine derivative (B), the compound (C) for lowering the melting point of the hydrazine derivative (B) is more preferably a saturated aliphatic carboxylic acid dihydrazide different from the hydrazine derivative (B).

The present inventors carried out various investigations on the hydrazine derivative (B) and the compound (C) for lowering the melting point of the hydrazine derivative (B) and some examples of them will next be described. The present inventors have found that when by using a differential scanning calorimeter, various 1:1 (mass ratio) mixtures of two carboxylic acid hydrazides are fused by heating at a heating rate of 2.5° C./min, maintained for 2 minutes at the temperature at which they are fused, cooled at a cooling rate of 10° C./min, and then heated again at a heating rate of 2.5° C./min, the melting point of these mixtures shows a behavior different from the melting point of each of the carboxylic acid hydrazides before mixing.

For example, an apex of an endothermic peak was found at 324° C. when terephthalic acid dihydrazide was heated at a rate of 2.5° C./min by using a differential scanning calorimeter ("DSC7", trade name; product of Perkin Elmer). Similarly, an apex of an endothermic peak was found at 226° C. when isophthalic acid dihydrazide was heated. Further, an apex of an endothermic peak was found at 181° C., 188° C., and 188° C., respectively, when adipic acid dihydrazide, sebacic acid dihydrazide, and dodecanedioic acid dihydrazide were heated.

Further, one carboxylic acid hydrazide or a 1:1 (mass ratio) mixture of two carboxylic acid hydrazides obtained by placing them in a mortar and then mixing and grinding the mixture therein was measured for its melting point with a differential scanning calorimeter ("DSC7", trade name; product of Perkin Elmer) by heating to 200° C. at a heating rate of 2.5° C./min, keeping at 200° C. for 2 minutes, cooling to 100° C. at a cooling rate of 10° C./min, and then heating at a heating rate of 2.5° C./min to confirm the apex of the endothermic peak.

For example, when adipic acid dihydrazine alone was subjected to differential scanning calorimetry as described above, two endothermic peaks were observed and melting points were found at 176° C. and 171° C. from the apexes of these peaks. The endothermic capacities (the endothermic capacity will hereinafter be called "ΔH") calculated from the areas of these endothermic peaks were 5.4 J/g and 229.2 J/g, respectively. A ratio of ΔH of the endothermic peak indicating the melting point of 171° C. to a total amount of ΔH, that is, a ratio of a peak area of the endothermic peak indicating the melting point of 171° C. to a total peak area of these endothermic peaks was 98% (refer to FIG. 1). When sebacic acid dihydrazide alone was subjected to differential scanning calorimetry similarly, melting points were observed at 185° C., 180° C., and 172° C. and ΔH of them were 5.4 J/g, 32.4 J/g, and 16.4 J/g, respectively. Further, a ratio of ΔH of the endothermic peaks indicating these melting points to a total amount of their ΔH was 10% at 185° C., 60% at 180° C., and 30% at 172° C., respectively (refer to FIG. 2). When dodecanedioic acid dihydrazide alone was subjected to similar measurement, melting points were observed at 183° C., 177° C., and 171° C. and their ΔH were 2.4 J/g, 18.1 J/g, and 32.4 J/g, respectively. Further, a ratio of ΔH of the endothermic peaks indicating these melting points to a total amount of their ΔH was 5% at 183° C., 34% at 177° C., and 61% at 171° C., respectively. Assuming that the temperature at which ΔH becomes highest among temperatures of the apex of an endothermic peak is called "main peak temperature" of the melting point, the main peak temperature of the melting point of adipic acid dihydrazide was 171° C., the main peak temperature of the melting point of sebacic acid dihydrazide was 180° C., and the main peak temperature of the melting point of dodecanedioic acid dihydrazide was 171° C.

Figure 3:
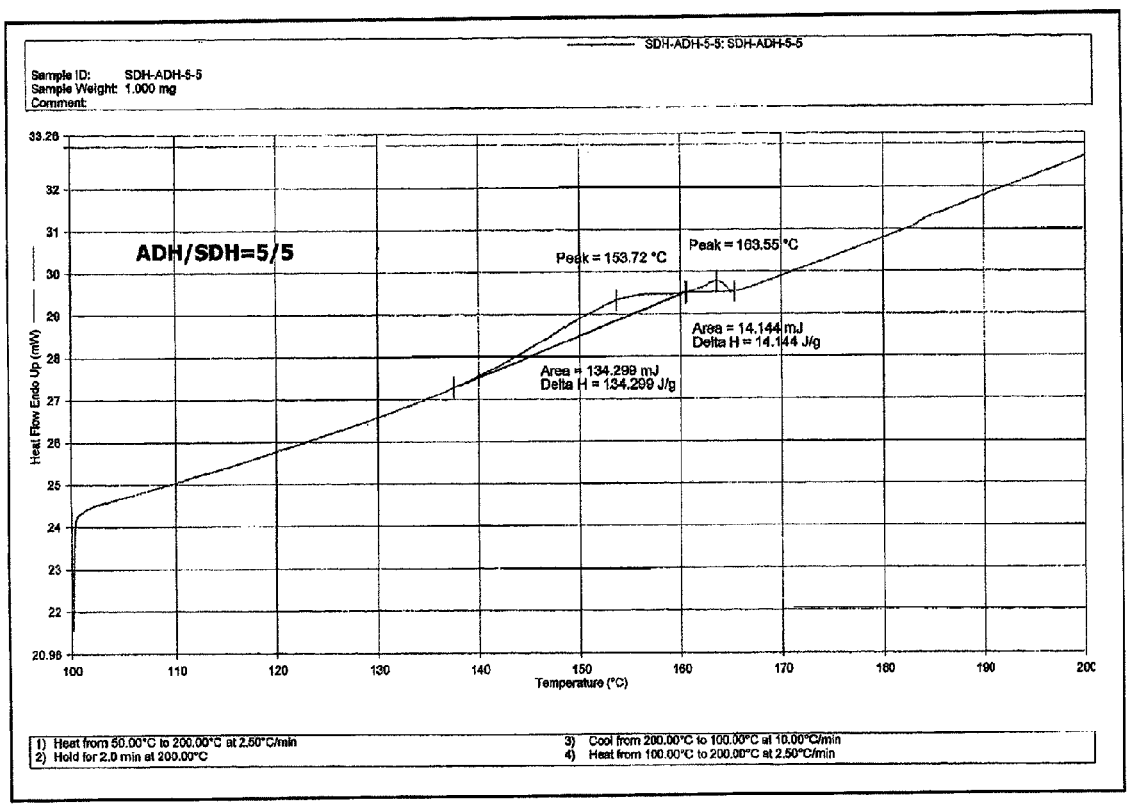
FIG. 3 is a chart showing the results of differential scanning calorimetry of a mixture of adipic acid hydrazide and sebacic acid dihydrazide.

When a 1:1 (mass ratio) mixture of adipic acid dihydrazide and sebacic acid dihydrazide was subjected to differential scanning calorimetry similarly, it had a main peak temperature of the melting point at 154° C. and a ratio of ΔH at the temperature to a total amount of ΔH was 91% (refer to FIG. 3). A 1:1 (mass ratio) mixture of adipic acid dihydrazide and dodecanedioic acid dihydrazide had a main peak temperature of the melting point at 151° C. and a ratio of ΔH at the temperature to a total amount of ΔH was 98%. A 1:1 (mass ratio) mixture of sebacic acid dihydrazide and dodecanedioic acid dihydrazide had a main peak temperature of the melting point at 144° C. and a ratio of ΔH at the temperature to a total amount of ΔH was 80%. This has revealed that these 1:1 (mass ratio) mixtures had a melting point (apex of endothermic peak) when each of them was heated and fused at a heating rate of 2.5° C./min, kept for 2 minutes at the temperature at which the mixture was fused, cooled to 100° C. at a cooling rate of 10° C./min, and then heated at a heating rate of 2.5° C./min.

Figure 4:
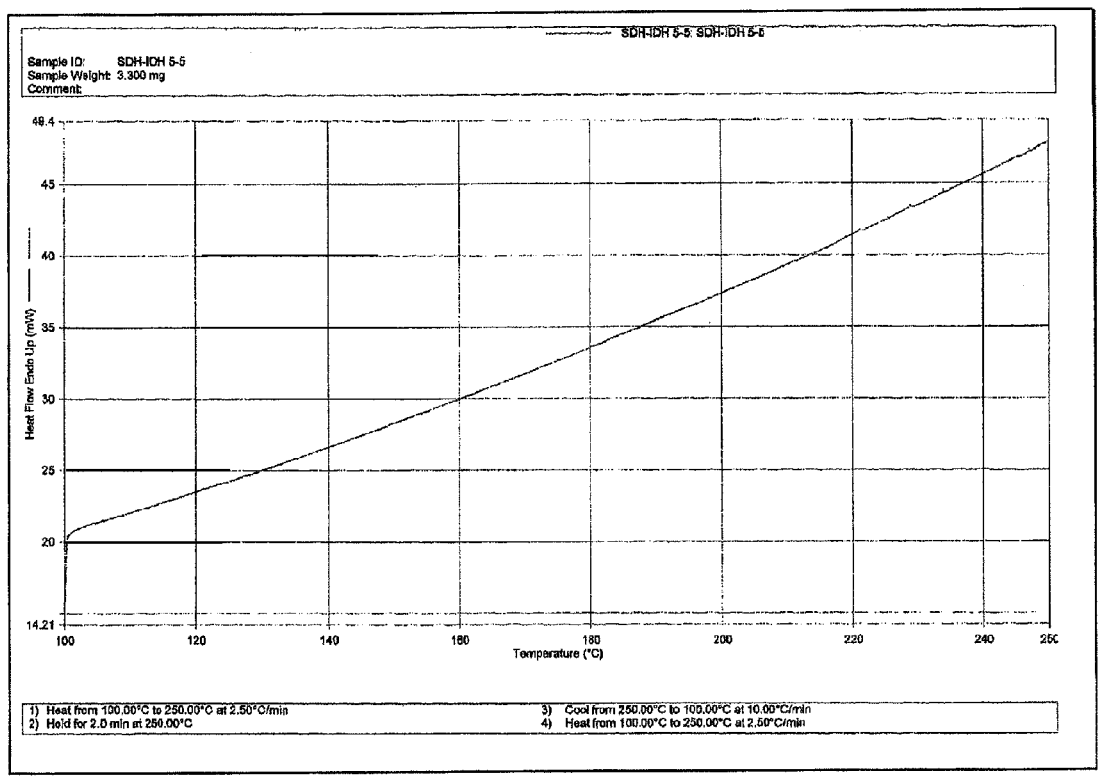
FIG. 4 is a chart showing the results of differential scanning calorimetry of a mixture of sebacic acid dihydrazide and isophthalic acid dihydrazide.
Figure 5:
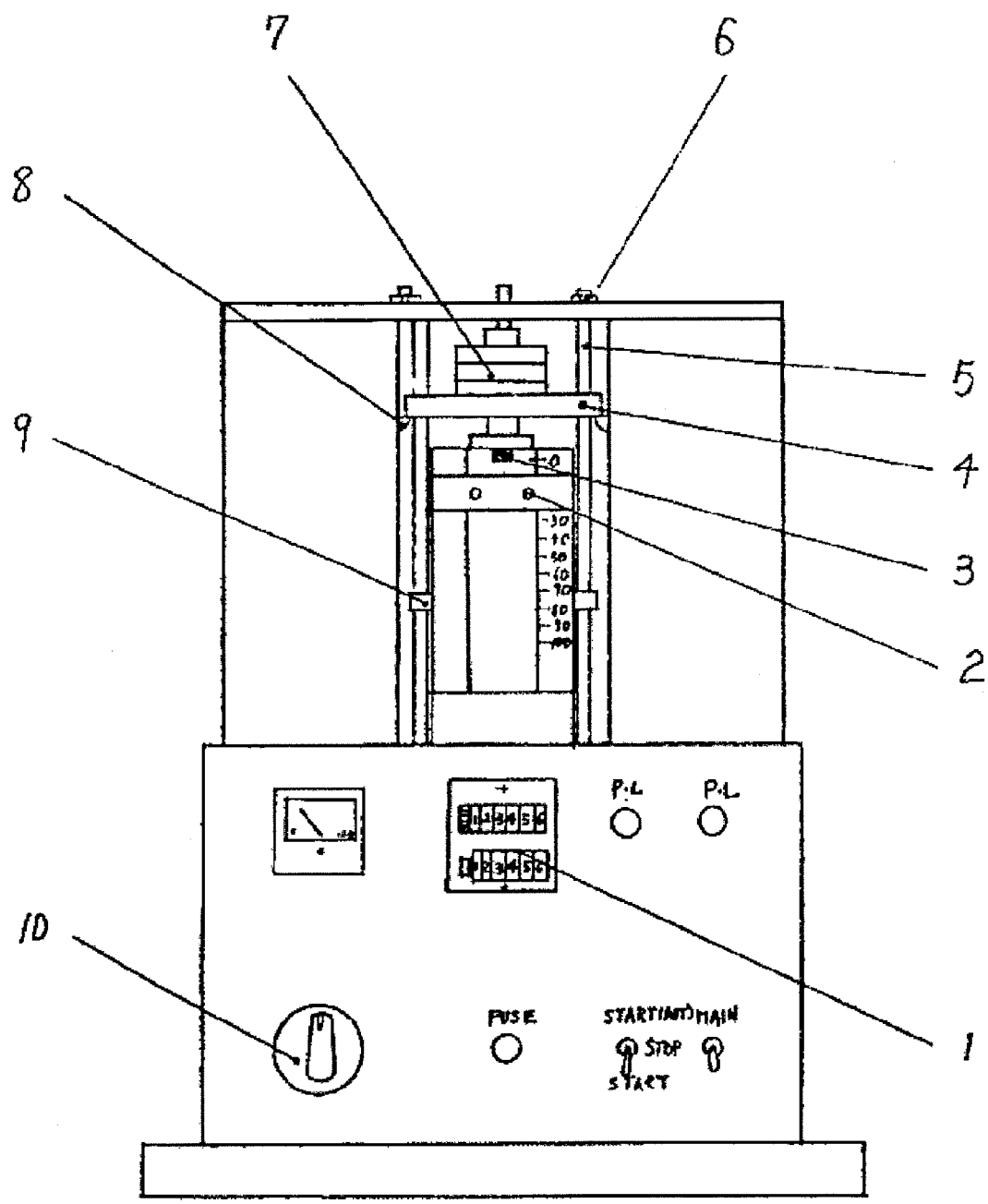
FIG. 5 is a schematic view showing both an apparatus and a test piece used for evaluating repeated impact resistance.

On the other hand, when a 1:1 (mass ratio) mixture of sebacic acid dihydrazide and isophthalic acid dihydrazide was heated to 250° C. at a heating rate of 2.5° C./min, an endothermic peak was observed at 181° C. No melting point (endothermic peak) was however observed when it was then held at 250° C. for 2 minutes, cooled to 100° C. at a cooling rate of 10° C./min, and then heated at a heating rate of 2.5° C./min. No crystallization occurred after first fusing (refer to FIG. 4). Similarly, a 1:1 (mass ratio) mixture of adipic acid dihydrazide and isophthalic acid dihydrazide, a 1:1 mixture (mass ratio) of adipic acid dihydrazide and terephthalic acid dihydrazide, and a 1:1 (mass ratio) mixture of terephthalic acid dihydrazide and isophthalic acid dihydrazide were heated to 350° C. at a heating rate of 2.5° C./min, held at 350° C. for 2 minutes, cooled to 100° C. at a cooling rate of 10° C./min, and then heated to 350° C. at a heating rate of 2.5° C./min, but no melting point (endothermic peak) was observed from them. This has revealed that a melting point (endothermic peak) disappeared when the above-described mixtures were each heated and fused at a heating rate of 2.5°

C./min, held for 2 minutes, cooled to 100° C. at a cooling rate of 10° C./min, and then heated at a heating rate of 2.5° C./min.

It has been found as a result of further investigation by the present inventors that a polyacetal resin composition obtained from a raw material composition containing the polyacetal resin (A), the hydrazine derivative (B), and the compound (C) for lowering the melting point of the hydrazine derivative (B), wherein a mixture of the hydrazine derivative (B) and the compound (C) for lowering the melting point of the hydrazine derivative (B) satisfies the conditions represented by the following formulas (1) and (2) is excellent in dimensional stability after aging, repeated impact resistance after aging, recycling moldability or formability, hot water resistance, and reducing mold deposit under the condition of a low resin filling rate in a mold.

$$T1<T2 \quad (1)$$

$$T1<T3 \quad (2)$$

In the formulas (1) and (2), T1 is a temperature (° C.) showing an apex of an endothermic peak of the mixture of the hydrazine derivative and the compound for lowering the melting point of the hydrazine derivative having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the hydrazine derivative (B) having a maximum endothermic capacity, among endothermic peaks obtained by, with the differential scanning calorimeter, heating and cooling the hydrazine derivative (B) in accordance with a predetermined temperature program and then heating at a rate of 2.5° C./min, and T3 is a temperature (° C.) showing an apex of an endothermic peak of the polyacetal resin (A) having a maximum endothermic capacity, among endothermic peaks obtained by, with the differential scanning calorimeter, heating and cooling the polyacetal resin in accordance with a predetermined temperature program and then heating at a rate of 2.5° C./min. The term "predetermined temperature program" means a temperature program in which the mixture or the hydrazine derivative (B) is heated at a rate of 2.5° C./min from a temperature lower than the endothermic peak of the mixture or hydrazine derivative (B) to a temperature at which the mixture or the hydrazine derivative (B) fuses, held at the temperature for 2 minutes, and then cooled to 100° C. at a cooling rate of 10° C./min. In the case of the polyacetal resin (A), the term "predetermined temperature program" means a temperature program in which the polyacetal resin (A) is heated at a rate of 320° C./min from a temperature lower than the endothermic peak of the polyacetal resin (A) to 200° C., held at 200° C. for 2 minutes, and then cooled to 100° C. at a rate of 10° C./min.

The above-described investigation suggests that the hydrazine derivative (B) is preferably a saturated aliphatic carboxylic acid hydrazide. Specific examples include carboxylic acid monohydrazides such as succinic acid monohydrazide, glutaric acid monohydrazide, adipic acid monohydrazide, pimelic acid monohydrazide, suberic acid monohydrazide, azelaic acid monohydrazide, and sebacic acid monohydrazide, and carboxylic acid dihydrazides such as succinic acid dihydrazide, glutaric acid dihydrazide, adipic acid dihydrazide, pimelic acid dihydrazide, suberic acid dihydrazide, azelaic acid dihydrazide, sebacic acid dihydrazide, and dodecanedioic acid dihydrazide.

The saturated aliphatic carboxylic acid hydrazide preferably contains a saturated aliphatic carboxylic dihydrazide represented by the following formula (3):

wherein, $R_1$ represents a substituted or unsubstituted divalent hydrocarbon group, preferably an alkylene group having from 2 to 20 carbon atoms.

No particular limitation is imposed on the compound (C) for lowering the melting point of the hydrazine derivative (B) insofar as it can lower the melting point of the hydrazine derivative (B) when added thereto. When the hydrazine derivative (B) is a saturated aliphatic carboxylic acid hydrazide, the compound (C) is preferably one or more saturated aliphatic carboxylic acid hydrazides different from the hydrazine derivative (B). When the hydrazine derivative (B) is a saturated aliphatic carboxylic acid dihydrazide, the compound (C) is preferably one or more saturated aliphatic carboxylic acid dihydrazides and/or saturated aliphatic carboxylic acids different from the hydrazine derivative (B). They are effective for lowering the melting point of the hydrazine derivative (B).

As more specific examples, the hydrazine derivative (B) and the compound (C) for lowering the melting point of the hydrazine derivative (B) preferably contain carboxylic acid dihydrazides selected from the group consisting of adipic acid dihydrazide, sebacic acid dihydrazide, and dodecanedioic acid dihydrazide but different from each other, respectively. It is preferred, for example, that when the hydrazine derivative (B) is adipic acid dihydrazide, the compound (C) is sebacic acid dihydrazide and/or dodecanedioic acid dihydrazide; when the hydrazine derivative (B) is sebacic acid dihydrazide, the compound (C) is adipic acid dihydrazide and/or dodecanedioic acid dihydrazide. Based on the observation in detail from the standpoint of dimensional stability after aging, repeated impact resistance after aging, recycling moldability or formability, and a reduction in the amount of mold deposit under the condition of a low resin filling rate in a mold, a combination of the hydrazine derivative (B) and the compound (C) is particularly excellent when a main peak area of a 1:1 (mass ratio) mixture of them having the maximum ΔH is less than 95% of ΔH of all the endothermic peaks of the mixture. As such a combination of the hydrazine derivative (B) and the compound (C), that of adipic acid dihydrazide as the hydrazine derivative (B) and sebacic acid dihydrazide as the compound (C), and that of sebacic acid dihydrazide as the hydrazine derivative (B) and dodecanedioic acid dihydrazide as the compound (C) are preferred.

A content ratio ((B):(C)) of the hydrazine derivative (B) to the compound (C) for lowering the melting point of the hydrazine derivative (B) is preferably from 2:8 to 8:2 by mass, more preferably from 3:7 to 7:3 by mass. When the content ratio falls within the above-described range, the main peak temperature of the mixture in solid form tends to become lower than the melting point of the polyacetal resin (A).

A total amount of the hydrazine derivative (B) and the compound (C) for lowering the melting point of the hydrazine derivative (B) in the raw material composition for obtaining the polyacetal resin composition of the present embodiment is preferably from 0.03 to 0.2 part by mass, more preferably from 0.04 to 0.2 part by mass based on 100 parts by mass of the polyacetal resin. When the total amount of the hydrazine derivative (B) and the compound (C) for lowering the melting point of the hydrazine derivative (B) is less than 0.03 part by mass, an amount of formaldehyde emission upon recycling molding or forming shows an increasing tendency. When it exceeds 0.2 part by mass, on the other hand, a reduction in the amount of the mold deposit under the condition of a low resin filling rate in a mold and repeated impact resistance after aging are likely to deteriorate.

[Additive]

The polyacetal resin composition of the present embodiment may contain a proper additive, depending on the intended use. Specific examples of the additive include antioxidants, polymers or compounds having a formaldehyde-reactive nitrogen, formic acid scavengers, and mold release agents.

An amount of each additive to be contained in the polyacetal resin composition is preferably from 0.001 to 0.8 part by mass, more preferably from 0.01 to 0.7 part by mass based on 100 parts by mass of the polyacetal resin.

[Antioxidant]

As the antioxidant, hindered phenol antioxidants are preferred. Examples of the antioxidant include n-octadecyl-3-(3',5'-di-t-butyl-4'-hydroxyphenyl)propionate, n-octadecyl-3-(3'-methyl-5'-t-butyl-4'-hydroxyphenyl)-propionate, n-tetradecyl-3-(3',5'-di-t-butyl-4'-hydroxyphenyl)propionate, 1,6-hexanediol-bis[3-(3,5-di-t-butyl-4-hydroxyphenyl)propionate], 1,4-butanediol-bis[3-(3,5-di-t-butyl-4-hydroxyphenyl)propionate], triethylene-glycol-bis[3-(3-t-butyl-5-methyl-4-hydroxyphenyl)-propionate], and pentaerythritol tetrakis[methylene-3-(3',5'-di-t-butyl-4'-hydroxyphenyl)propionate]methane. Of these antioxidants, triethylene-glycol-bis[3-(3-t-butyl-5-methyl-4-hydroxyphenyl)propionate] and pentaerythritol tetrakis[methylene-3-(3',5'-di-t-butyl-4'-hydroxyphenyl)propionate]methane are preferred. These antioxidants may be used either singly or in combination.

[Polymer or Compound Having Formaldehyde-Reactive Nitrogen]

The polymer or compound having a formaldehyde-reactive nitrogen is a polymer or compound (monomer) having, in the molecule thereof, a nitrogen atom reactive with formaldehyde and specific examples of it include polyamide resins such as Nylon 4-6, Nylon 6, Nylon 6-6, Nylon 6-10, Nylon 6-12, and Nylon 12 and polymers thereof such as Nylon 6/6-6/6-10 and Nylon 6/6-12. Additional examples of the polymer or compound having a formaldehyde-reactive nitrogen include acrylamide and derivatives thereof, and copolymers of acrylamide or derivative thereof and another vinyl monomer, more specifically, poly-β-alanine copolymers obtained by polymerizing acrylamide or derivative thereof and another vinyl monomer in the presence of a metal alcoholate. Further examples of the polymer or compound having a formaldehyde-reactive nitrogen include amide compounds, amino-substituted triazine compounds, adducts of amino-substituted triazine compounds with formaldehyde, condensates between amino-substituted triazine compounds and formaldehyde, urea, urea derivatives, imidazole compounds, and imide compounds.

Specific examples of the amide compound include polycarboxylic acid amides such as isophthalic diamide, and anthranilamide. Specific examples of the amino-substituted triazine compound include 2,4-diamino-sym-triazine, 2,4,6-triamino-sym-triazine, N-butylmelamine, N-phenylmelamine, N,N-diphenylmelamine, N,N-diallylmelamine, benzoguanamine(2,4-diamino-6-phenyl-sym-triazine), acetoguanamine(2,4-diamino-6-methyl-sym-triazine), and 2,4-diamino-6-butyl-sym-triazine. Specific examples of the adduct of an amino-substituted triazine compound with formaldehyde include N-methylolmelamine, N,N'-dimethylolmelamine, and N,N',N"-trimethylolmelamine. Specific examples of the condensate between an amino-substituted triazine compound and formaldehyde include melamine-formaldehyde condensate. Examples of the urea derivative include N-substituted urea, urea condensates, ethylene urea, hydantoin compounds, and ureido compounds. Specific examples of the N-substituted urea include methyl urea, alkylenebis urea, and aryl-substituted urea obtained by substitution with a substituent such as alkyl group. Specific examples of the urea condensate include urea-formaldehyde condensate. Specific examples of the hydantoin compound include hydantoin, 5,5-dimethylhydantoin, 5,5-dimethylhydantoine, and 5,5-diphenylhydantoin. Specific examples of the ureido compound include allantoin. Specific examples of the imide compound include succinimide glutarimide, and phthalimide.

These polymers or compounds having a formaldehyde-reactive nitrogen may be used either singly or in combination.

[Formic Acid Scavenger]

The formic acid scavenger can neutralize formic acid efficiently and examples of it include the amino-substituted triazine compounds exemplified above and condensates between an amino-substituted triazine compound and formaldehyde such as melamine-formaldehyde condensate.

Additional examples of the formic acid scavenger include hydroxides, inorganic acid salts, carboxylic acid salts, and alkoxides of an alkali metal or alkaline earth metal, more specifically, hydroxides, carbonates, phosphates, silicates, borates, and carboxylates of a metal such as sodium, potassium, magnesium, calcium or barium. As the carboxylic acid of the carboxylates, saturated or unsaturated aliphatic carboxylic acids having from 10 to 36 carbon atoms are preferred. In these carboxylic acids, a hydrogen atom thereof may be substituted with a hydroxyl group. Specific examples of the saturated or unsaturated aliphatic carboxylates include calcium dimyristate, calcium dipalmitate, calcium distearate, calcium (myristate-palmitate), calcium (myristate-stearate), and calcium (palmitate-stearate). Of these, calcium dipalmitate, calcium distearate, and magnesium silicate are preferred.

[Mold Release Agent]

As the mold release agent, alcohols and fatty acids, and fatty acid esters thereof are preferred, with ethylene glycol distearate being particularly preferred.

[Other Additives]

The polyacetal resin composition of the present embodiment may further contain an appropriate known additive as needed without damaging the objects of the present invention. Specific examples include inorganic fillers, crystal nucleating agents, electroconductive additives, thermoplastic resins, thermoplastic elastomers, and pigments.

[Inorganic Filler]

Examples of the inorganic filler include inorganic fillers in the fiber form, powder form, plate form, or hollow form. The inorganic fillers in the fiber form include, for example, glass fibers, carbon fibers, silicone fibers, silica-alumina fibers, zirconia fibers, boron nitride fibers, silicon nitride fibers, boron fibers, potassium titanate fibers, and metal fibers such as stainless, aluminum, titanium, copper, or brass. In addition, whiskers such as potassium titanate whiskers and zinc oxide whiskers having a short fiber length can also be given as examples.

Examples of the inorganic filler in the powder form include carbon black, silica, quartz powder, glass beads, glass powder, silicates such as calcium silicate, magnesium silicate, aluminum silicate, kaolin, clay, diatomaceous earth, and wollastonite, metal oxides such as iron oxide, titanium oxide, and alumina, metal sulfates such as calcium sulfate and barium sulfate, and carbonates such as magnesium carbonate and dolomite, and in addition, silicon carbide, silicon nitride, boron nitride, and various metal powders.

Examples of the inorganic filler in the plate form include mica, glass flakes, and various metal foils. Examples of the inorganic filler in the hollow form include glass balloon, silica balloon, Shirasu balloon, and metal balloon. These inorganic fillers may be used either singly or in combination. These inorganic fillers may be either surface-treated or not, but surface-treated ones are sometimes preferred from the standpoint of surface smoothness of molded or formed products and mechanical properties. As a surface treating agent to be used for the surface treatment of the inorganic filler, conventionally known ones can be used. Examples of the surface treatment agent include various coupling agents such as silane coupling agents, titanate coupling agents, aluminum coupling agents, and zirconium coupling agents. More specific examples include N-(2-aminoethyl)-3-aminopropyltriethoxysilane, 3-glycidoxypropyltrimethoxysilane, isopropyl tristearoyl titanate, diisopropoxyammonium ethyl acetate, and n-butyl zirconate.

In addition to or instead of the inorganic filler, a refractory organic fibrous substance such as aromatic polyamide resin, fluorine resin, or acrylic resin may be used.

[Electroconductive Additive]

Examples of the electroconductive additive include electroconductive carbon black, metal powder, and fibers.

[Thermoplastic Resin and Thermoplastic Elastomer]

Examples of the thermoplastic resin include polyolefin resins, acrylic resins, styrene resins, polycarbonate resins, and uncured epoxy resins. They also include modified products of these resins. Examples of the thermoplastic elastomers include polyurethane elastomers, polyester elastomers, polystyrene elastomers, and polyamide elastomers.

[Pigment]

Examples of the pigment include inorganic pigments, organic pigments, metallic pigments, and fluorescent pigments. The term "inorganic pigments" as used herein means inorganic pigments ordinarily used for coloring of resins and examples include zinc sulfide, titanium oxide, barium sulfate, titanium yellow, cobalt blue, calcined pigments, carbonates, phosphates, acetates, carbon black, acetylene glack, and lamp black. Examples of the organic pigments include condensed azo pigments, quinoline pigments, phthalocyanine pigments, monoazo pigments, diazo pigments, polyazo pigments, anthraquinone pigments, heterocyclic pigments, perinone pigments, quinacridone pigments, thioindigo pigments, perylene pigments, and dioxazine pigments.

In the polyacetal resin composition of the present embodiment, a tensile elongation retention of a molding thereof is preferably 50% or greater. The tensile elongation retention is measured in accordance with the method described below in Examples. In general, use of an additive to a polyacetal resin adversely affects the compatibility, leading to deterioration in hot water resistance. It is therefore necessary, for example, to heighten the compatibility in order to raise the tensile elongation retention to 50% or greater. One of the methods is to approximate the melting point of the additive to that of the polyacetal resin. A polyacetal resin composition using such an additive can provide a molded or formed product whose deterioration in hot water resistance is suppressed further.

[Preparation Process of Polyacetal Resin Composition]

There is no particular limitation imposed on the preparation process of the polyacetal resin composition of the present embodiment. It can be prepared by a conventionally known preparation process of a polyacetal resin composition, for example, by mixing in advance the polyacetal resin (A), the hydrazine derivative (B), and the compound (C) in a Henschel mixer, tumbler, V-shaped blender, or the like to obtain a raw material composition containing them; and then melting and kneading the resulting raw material composition in a single-screw or multi-screw kneader extruder or the like. Using a twin-screw kneader extruder equipped with a pressure reducing apparatus in the above-described process is particularly preferred. It is also possible to continuously supply an extruder with the polyacetal resin (A), the hydrazine derivative (B), and the compound (C) either singly or in combination of several components through a feeder control without mixing them in advance to obtain a raw material composition in the extruder and then preparing a polyacetal resin composition from the raw material composition. A polyacetal resin composition can also be obtained by preparing a high-concentration master batch composed of the polyacetal resin (A), the hydrazine derivative (B), and the compound (C) in advance and diluting it with the polyacetal resin (A) upon extruding, melting, and kneading or upon injection molding.

The polyacetal resin composition thus prepared may contain a reaction product derived from a carboxylic acid dihydrazide. Such a reaction product is, for example, a reaction product between a carboxylic acid dihydrazide and formaldehyde.

[Molding or Forming Method of Polyacetal Resin Composition]

No particular limitation is imposed on the molding or forming method of the polyacetal resin composition of the present embodiment. The polyacetal resin composition can therefore be molded or formed by any of the conventionally known molding or forming methods such as extrusion, injection molding, vacuum forming, blow molding, injection compression molding, decorative molding, multi-material molding, gas assist injection molding, foam injection molding, low pressure molding, ultra thin wall injection molding (ultra-high-speed injection molding), and in-mold composite molding (insert molding, outsert molding).

[Application]

Molded or formed products obtained by molding or forming the polyacetal resin composition of the present embodiment are excellent in recycling moldability or formability so that it can be used for molded or formed products of various applications. Examples of such molded or formed products include structural parts typified by gear, cam, slider, lever, arm, clutch, felt clutch, idler gear, pulley, roller, roll, key stem, key top, shutter, reel, shaft, joint, axle, bearing, and guide, resin parts obtained by outsert molding, resin parts obtained by insert molding, chassis, tray, side plate, parts for office automation equipment typified by printer and copying machine, parts for cameras and video devices typified by VTR (video tape recorder), video movie, digital video camera, camera, and digital camera, music, image and information devices such as cassette player, DAT, LD (laser disc), MD (mini disc), CD (compact disc: including CD-ROM (read only memory), CD-R (recordable), and CD-RW (rewritable)), DVD (digital video disc: including DVD-ROM, DVD-R, DVD+R, DVD-RW, DVD+RW, DVD-R DL, DVD+R, DL, DVD-RAM (random access memory), and DVD-Audio), optical disc drive, MFD, MO, navigation system, and mobile personal computer, parts for communications apparatuses such as cellular phone and facsimile, parts for electrical devices, and parts for electronic devices. They also include, as the molded or formed products of the present embodiment, automotive parts such as fuel system parts typified by gas tank, fuel pump module, valve, and gas tank flange, door-related parts typified by door lock, door handle, window regulator, and speaker grill, seat belt-related parts typified by slip ring and press button, combination switch parts, parts for switches, and parts for clips. They further include, as the molded or formed products of the present embodiment, structural parts for fitting or removing the ball point or lead of mechanical pencil, structural parts for opening and closing washbasins, drainage outlets, and waste plugs, parts for opening and closing section locking mechanism and commodity discharging mechanism of automatic vending machine, cord stopper, adjuster and button for clothing, water spray nozzle and spray hose joint, construction parts such as handrail at staircase and flooring support, and industrial parts typified by throwaway camera, toy, fastener, chain, conveyor, buckle, sporting goods, automatic vending machine, furniture, musical instruments, and housing equipment. Of these, the molded or formed products of the present embodiment are particularly suited for interior and structure parts for automotives such as door, sunroof, sheet belt, switch, clip, sheet, and wiper, more specifically, inside handle base, carrier plate, window regulator pulley, door latch part, speaker grill, sunroof part, press button, retractor part, sheet belt adjuster, steering column, leveler controller, cluster clip, ECU case, curtain air bag clip, assist grip clip, spindle nut, sheet adjuster part, lumber support, and motor gear part. The molded or formed products are however not limited to them.

The polyacetal resin composition of the present embodiment is a resin composition excellent in dimensional stability after aging, repeated impact resistance after aging, moldability or formability upon recycling, hot water resistance, and reducing mold deposit under the condition of a low resin filling rate in a mold.

Next, a description will be given of a second embodiment. The polyacetal resin composition according to the second embodiment is a polyacetal resin composition obtained from a raw material composition containing a polyacetal resin (A), a hydrazine derivative (B), a compound (C) for lowering the melting point of the hydrazine derivative (B), and a polyalkylene glycol (D), wherein a mixture of the hydrazine derivative (B) and the compound (C) for lowering the melting point of the hydrazine derivative (B) satisfies the conditions represented by the above formulas (1) and (2). The term "raw material composition" as used in this embodiment means a composition containing the above-described four components and the polyacetal resin composition of the present embodiment can be obtained by subjecting the raw material composition to some treatments (for example, mixing, melting, and kneading). It is however to be noted that the polyacetal resin composition obtained by giving some treatments preferably remains to contain these four components.

As a result of investigation, the present inventors have found that a polyacetal resin composition obtained from a raw material composition containing a polyacetal resin (A), a hydrazine derivative (B), a compound (C) for lowering the melting point of the hydrazine derivative (B), and a polyalkylene glycol (D), wherein a mixture of the hydrazine derivative (B) and the compound (C) for lowering the melting point of the hydrazine derivative (B) satisfies the conditions represented by the above formulas (1) and (2) generates a reduced amount of formaldehyde after sliding, suppresses crack generation under aging, and is excellent in reducing mold deposit under the condition of a low resin filling rate in a mold.

No particular limitation is imposed on the compound (C) for lowering the melting point of the hydrazine derivative (B) insofar as, as described above, it can lower the melting point of the hydrazine derivative (B) when added thereto. When the hydrazine derivative (B) is a saturated aliphatic carboxylic acid hydrazide, the compound (C) is preferably one or more saturated aliphatic carboxylic acid hydrazides different from the hydrazine derivative (B). When the hydrazine derivative (B) is a saturated aliphatic carboxylic acid dihydrazide, the compound (C) is preferably one or more saturated aliphatic carboxylic acid dihydrazides and/or saturated aliphatic carboxylic acids different from the hydrazine derivative (B). They are effective for lowering the melting point of the hydrazine derivative (B).

More specifically, the hydrazine derivative (B) and the compound (C) for lowering the melting point of the hydrazine derivative (B) preferably contain carboxylic acid dihydrazides selected from the group consisting of adipic acid dihydrazide, sebacic acid dihydrazide, and dodecanedioic acid dihydrazide but different from each other, respectively. For example, when the hydrazine derivative (B) is adipic acid dihydrazide, the compound (C) is preferably sebacic acid dihydrazide and/or dodecanedioic acid dihydrazide. When the hydrazine derivative (B) is sebacic acid dihydrazide, the compound (C) is preferably adipic acid dihydrazide and/or dodecanedioic acid dihydrazide. Based on the observation in detail from the standpoint of reducing an amount of formaldehyde generated after sliding, suppressing crack generation under aging, and being excellent in reducing mold deposit under the condition of a low resin filling rate in a mold, a combination of the hydrazine derivative (B) and the compound (C) is particularly excellent when a main peak area of a 1:1 (mass ratio) mixture of them having the maximum $\Delta H$ is less than 95% of $\Delta H$ of all the endothermic peaks of the mixture. As such a combination of the hydrazine derivative (B) and the compound (C), that of adipic acid dihydrazide as the hydrazine derivative (B) and sebacic acid dihydrazide as the compound (C), and that of sebacic acid dihydrazide as the hydrazine derivative (B) and dodecanedioic acid dihydrazide as the compound (C) are preferred.

A content ratio ((B):(C)) of the hydrazine derivative (B) to the compound (C) for lowering the melting point of the hydrazine derivative (B) is preferably from 2:8 to 8:2 by mass, more preferably from 3:7 to 7:3 by mass. When the content ratio falls within the above-described range, the main peak temperature of the mixture in solid form tends to become lower than the melting point of the polyacetal resin (A).

A total amount of the hydrazine derivative (B) and the compound (C) for lowering the melting point of the hydrazine derivative (B) in the raw material composition for obtaining the polyacetal resin composition of the present embodiment is preferably from 0.03 to 0.2 part by mass, more preferably from 0.04 to 0.2 part by mass, still more preferably from 0.05 to 0.2 part by mass, each based on 100 parts by mass of the polyacetal resin. When the total amount of the hydrazine derivative (B) and the compound (C) for lowering the melting point of the hydrazine derivative (B) is less than 0.03 part by mass, an amount of formaldehyde emission after sliding shows an increasing tendency. The total amounts exceeding 0.2 part by mass, on the other hand, are likely to deteriorate the effect of suppressing crack generation under aging and a reduction in the amount of the mold deposit under the condition of a low resin filling rate in a mold.

[Polyalkylene Glycol (D)]

No particular limitation is imposed on the polyalkylene glycol (D), but those containing polyethylene glycol and/or polypropylene glycol are preferred, with those containing polyethylene glycol being more preferred. The number average molecular weight of the polyalkylene glycol (D) is preferably from 300 to 10000, more preferably from 300 to 9000 from the standpoint of suppressing crack generation under aging. It is to be noted that the number average molecular weight of the polyalkylene glycol is determined by GPC.

The content of the polyalkylene glycol (D) in the polyoxymethylene resin composition of the present embodiment is from 2 to 20 times the mass, preferably from 2 to 18 times the mass, more preferably from 3 to 10 times the mass of the mixture of the hydrazine derivative (B) and the compound (C) for lowering the melting point of the hydrazine derivative (B). The content of it is preferably 2 times the mass or greater from the standpoint of reducing the amount of formaldehyde generated after sliding and suppressing crack generation under aging further, and the content of it is preferably not greater than 20 times the mass from the standpoint of improving a reduction in the amount of the mold deposit under the condition of a low resin filling rate in a mold. These polyalkylene glycols may be used either singly or in combination.

[Additive]

The polyacetal resin composition of the present embodiment may contain a proper additive, depending on the intended use. Specific examples of the additive include hindered phenol antioxidants, polymers or compounds having a formaldehyde-reactive nitrogen, formic acid scavengers, and mold release agents.

An amount of each additive to be contained in the polyacetal resin composition is preferably from 0.001 to 0.8 part by mass, more preferably from 0.01 to 0.7 part by mass based on 100 parts by mass of the polyacetal resin.

[Hindered Phenol Antioxidant]

Examples of the hindered phenol antioxidant include, but not limited to, n-octadecyl-3-(3',5'-di-t-butyl-4'-hydroxyphenyl)propionate, n-octadecyl-3-(3'-methyl-5'-t-butyl-4'-hydroxyphenyl)propionate, n-tetradecyl-3-(3',5'-di-t-butyl-4'-hydroxyphenyl)propionate, 1,6-hexanediol-bis[3-(3,5-di-t-butyl-4-hydroxyphenyl)propionate], 1,4-butanediol-bis[3-(3,5-di-t-butyl-4-hydroxyphenyl)propionate], triethylene glycol bis[3-(3-t-butyl-5-methyl-4-hydroxyphenyl)propionate], and pentaerythritol tetrakis[methylene-3-(3',5'-di-t-butyl-4'-hydroxyphenyl)propionate]. Of these antioxidants, n-octadecyl-3-(3',5'-di-t-butyl-4'-hydroxyphenyl)propionate, n-octadecyl-3-(3'-methyl-5'-t-butyl-4'-hydroxyphenyl)propionate, n-tetradecyl-3-(3',5'-di-t-butyl-4'-hydroxyphenyl)propionate, 1,6-hexanediol-bis[3-(3,5-di-t-butyl-4-hydroxyphenyl)propionate], 1,4-butanediol-bis[3-(3,5-di-t-butyl-4-hydroxyphenyl)propionate], triethylene glycol bis[3-(3-t-butyl-5-methyl-4-hydroxyphenyl)propionate], and pentaerythritol tetrakis[methylene-3-(3',5'-di-t-butyl-4'-hydroxyphenyl)propionate] are preferred, of which triethylene glycol bis[3-(3-t-butyl-5-methyl-4-hydroxyphenyl)propionate] and pentaerythritol tetrakis[methylene-3-(3',5'-di-t-butyl-4'-hydroxyphenyl)propionate] are more preferred from the standpoint of improving the effect of suppressing crack generation under aging. These hindered phenol antioxidants may be used either singly or in combination.

[Polymer or Compound Having Formaldehyde-Reactive Nitrogen]

The polymer or compound having a formaldehyde-reactive nitrogen is a polymer or compound (monomer) having, in the molecule thereof, a nitrogen atom reactive with formaldehyde and specific examples of it include polyamide resins such as Nylon 4-6, Nylon 6, Nylon 6-6, Nylon 6-10, Nylon 6-12, and Nylon 12 and polymers thereof such as Nylon 6/6-6/6-10 and Nylon 6/6-12. Additional examples of the polymer or compound having a formaldehyde-reactive nitrogen include acrylamide and derivatives thereof, and copolymers of acrylamide or derivative thereof and another vinyl monomer, more specifically, poly-β-alanine copolymers obtained by polymerization of acrylamide or derivative thereof and another vinyl monomer in the presence of a metal alcoholate. Further examples of the polymer or compound having a formaldehyde-reactive nitrogen include amide compounds, amino-substituted triazine compounds, adducts of amino-substituted triazine compounds with formaldehyde, condensates between amino-substituted triazine compounds and formaldehyde, urea, urea derivatives, imidazole compounds, and imide compounds.

Specific examples of the amide compound include polycarboxylic acid amides such as isophthalic diamide, and anthranylamide. Specific examples of the amino-substituted triazine compound include 2,4-diamino-sym-triazine, 2,4,6-triamino-sym-triazine, N-butylmelamine, N-phenylmelamine, N,N-diphenylmelamine, N,N-diallylmelamine, benzoguanamine(2,4-diamino-6-phenyl-sym-triazine), acetoguanamine(2,4-diamino-6-methyl-sym-triazine), and 2,4-diamino-6-butyl-sym-triazine. Specific examples of the adduct of an amino-substituted triazine compound with formaldehyde include N-methylolmelamine, N,N'-dimethylolmelamine, and N,N',N'''-trimethylolmelamine. Specific examples of the condensate between an amino-substituted triazine compound and formaldehyde include melamine-formaldehyde condensate. Examples of the urea derivative include N-substituted urea, urea condensates, ethylene urea, hydantoin compounds, and ureido compounds. Specific examples of the N-substituted urea include methyl urea, alkylenebis urea, and aryl-substituted urea obtained by substitution with a substituent such as alkyl group. Specific examples of the urea condensate include urea-formaldehyde condensate. Specific examples of the hydantoin compound include hydantoin, 5,5-dimethylhydantoin, and 5,5-diphenylhydantoin. Specific examples of the ureido compound include allantoin. Specific examples of the imide compound include succinimide, glutarimide, and phthalimide.

These polymers or compounds having a formaldehyde-reactive nitrogen may be used either singly or in combination.

[Preparation Process of Polyacetal Resin Composition]

A preparation process of the polyacetal resin composition of the present embodiment is not particularly limited. It can be prepared in a conventionally known manner, for example, by preliminarily mixing the polyacetal resin (A), the hydrazine derivative (B), the compound (C), and the polyalkylene glycol (D) and if necessary, the hindered phenol antioxidant in a Henschel mixer, tumbler, or a V-shaped blender and then melting and kneading the resulting mixture by using a single screw or multi-screw kneader extruder. Using a twin-screw kneader extruder equipped with a pressure reducing device in the above-described process is preferred. It is also possible to continuously supply an extruder with the polyacetal resin (A), the hydrazine derivative (B), the compound (C), the polyalkylene glycol (D), and the hindered phenol antioxidant either singly or in combination of several components through a feeder control without mixing them in advance to obtain a polyacetal resin composition. A polyacetal resin composition can also be obtained by preparing a high-concentration master batch composed of the polyacetal resin (A), the hydrazine derivative (B), the compound (C), and the polyalkylene glycol (D) in advance and diluting it with the polyacetal resin (A) upon extruding, melting, and kneading or upon injection molding.

The polyacetal resin composition of the present embodiment is a resin composition that generates a reduced amount of formaldehyde after sliding, suppresses crack generation under aging, and generates a reduced mount of mold deposit under the condition of a low resin filling rate in a mold.

The polyacetal resin (A), the hydrazine derivative (B), formic acid scavenger, mold release agent, other additives (inorganic filler, electroconductive agent, thermoplastic resin, thermoplastic elastomer, and pigment), and the molding or forming method and application of the polyacetal resin composition in the second embodiment, which are not described above, are similar to those in the first embodiment so that detailed description on them is omitted here.

Next, a description will be given of a third embodiment. A polyacetal resin composition prepared in the present embodiment is obtained from a raw material composition containing a polyacetal resin (A), a hydrazine derivative (B), a compound (C) for lowering the melting point of the hydrazine derivative (B). The term "raw material composition" as used in this embodiment means a composition containing the above-described three components and the polyacetal resin composition of the present embodiment is obtained by subjecting the raw material composition to some treatments (for example, mixing, melting, and kneading). The polyacetal resin composition obtained by some treatments preferably continues to contain the above-described three components.

The polyacetal resin composition of the present embodiment is a polyacetal resin composition obtained from a raw material composition containing a polyacetal resin (A), a hydrazine derivative (B), and a compound (C) for lowering the melting point of the hydrazine derivative (B), wherein a mixture of the hydrazine derivative (B) and the compound (C) for lowering the melting point of the hydrazine derivative (B) satisfies the conditions represented by the above formulas (1) and (2).

In the present embodiment, when the polyacetal resin (A) is a polyacetal copolymer of trioxane and the above-described comonomer such as 1,3-dioxolane, a copolymerization ratio of the comonomer preferably falls within a range of from 0.001 to 0.6 mol per mol of trioxane because it improves thermal stability. The copolymerization ratio of the comonomer is more preferably from 0.001 to 0.2 mol, still more preferably from 0.0013 to 0.1 mol, particularly preferably from 0.0013 to 0.0039 mol.

As a result of investigation, the present inventors have found that a polyacetal resin composition obtained by a raw material composition containing the polyacetal resin (A), the hydrazine derivative (B), and the compound (C) for lowering the melting point of the hydrazine derivative (B), wherein a mixture of the hydrazine derivative (B) and the compound (C) for lowering the melting point of the hydrazine derivative (B) satisfies the conditions represented by the above formulas (1) and (2) is excellent in dimensional stability after aging, repeated impact resistance after aging, recycling moldability or formability, and reducing mold deposit under the condition of a low resin filling rate in a mold.

[Preparation Process of Polyacetal Resin Composition]

A preparation process of the polyacetal resin composition according to one mode of the present embodiment has a first step of preparing a mixture of the hydrazine derivative (B) and the compound (C) for lowering the melting point of the hydrazine derivative (B) and a second step of melting and kneading the mixture obtained through the first step with the polyacetal resin (A). The mixture satisfies the conditions represented by the above-described formulas (1) and (2).

Described specifically, in the first step in the preparation process according to the one mode, the hydrazine derivative (B) and the compound (C) for lowering the melting point of the hydrazine derivative (B) are mixed in a Henschel mixer, tumbler, a V-shaped blender, or the like. In the second step, the polyacetal resin (A) and the mixture of the hydrazine derivative (B) and the compound (C) for lowering the melting point of the hydrazine derivative (B) obtained through the first step are supplied to a single-screw or multi-screw kneader extruder by using a feeder constant or the like and melted and kneaded in the extruder. Alternatively, in the second step, the polyacetal resin (A) and the mixture of the hydrazine derivative (B) and the compound (C) for lowering the melting point of the hydrazine derivative (B) obtained through the first step are mixed in a Henschel mixer, tumbler, V-shaped blender or the like and then, the resulting mixture is supplied to a single screw or multi-screw kneader extruder by using a feeder control or the like and melted and kneaded in the extruder. As the second step, either one of the above-described two steps is preferred. Of these, a step of using a twin screw kneader extruder equipped with a pressure reducing apparatus is particularly preferred. The polyacetal resin composition of the present embodiment can be obtained through these first and second steps.

The preparation process according to this embodiment may have, prior to the second step, a third step of melting the mixture of the hydrazine derivative (B) and the compound (C) for lowering the melting point of the hydrazine derivative (B) obtained through the first step by using a heating unit. In this case, in the second step, the molten mixture obtained through the third step may be added to the extruder by using a pump for liquid and the resulting mixture may be kneaded with the polyacetal resin (A) which has been melted.

In a second mode, the preparation process of a polyacetal resin composition of the present embodiment has a first step of mixing a portion of the polyacetal resin (A), the hydrazine derivative (B), and the compound (C) for lowering the melting point of the hydrazine derivative (B) to obtain a pre-mixture and a second step of melting and kneading the pre-mixture obtained through the first step with a remaining portion of the polyacetal resin (A). In this mode, the mixture of the hydrazine derivative (B) and the compound (C) for lowering the melting point of the hydrazine derivative (B) satisfy the conditions represented by the above formulas (1) and (2).

In the preparation process in the second mode, a specific mixing method in the first step is similar to that of the first mode except that components to be mixed contain a portion of the polyacetal resin (A). In addition, as a specific melting and kneading method in the second step, the pre-mixture of a portion of the polyacetal resin (A), the hydrazine derivative (B), and the compound (C) for lowering the melting point of the hydrazine derivative (B) obtained through the first step and the remaining portion of the polyacetal resin (A) are supplied separately to a single-screw or twin-screw kneader extruder or the like through a feeder constant and melted and kneaded in the extruder. Alternatively, in the second step, the pre-mixture of a portion of the polyacetal resin (A), the hydrazine derivative (B), and the compound (C) for lowering the melting point of the hydrazine derivative (B) obtained by the first step is supplied from the side of the extruder and melted and kneaded with the remaining portion of the polyacetal resin (A) which has been melted. Either one of the above-described methods is preferred as the second step, of which a step of using a twin-screw kneader extruder equipped with a pressure reducing device is particularly preferred.

In the first step in the second mode, a high-concentration master batch containing a portion of the polyacetal resin (A), the hydrazine derivative (B), and the compound (C) for lowering the melting point of the hydrazine derivative (B) may be prepared as the pre-mixture. In this case, the high-concentration master batch may be diluted with the remaining portion of the polyacetal resin (A) upon extruding, melting and kneading or upon injection molding in the second step. This enables to prepare the polyacetal resin composition of the present embodiment. In the high-concentration master batch, a total content of the hydrazine derivative (B) and the compound (C) for lowering the melting point of the hydrazine derivative (B) is preferably from 0.1 to 50 mass %.

The preparation process in the second mode may have a third step of melting the pre-mixture of the hydrazine derivative (B) and the compound (C) for lowering the melting point of the hydrazine derivative (B) obtained through the first step by using a heating unit before the mixture is provided for the second step. In this case, in the second step, it is also possible to knead the molten mixture obtained through the third step with the remaining portion of the polyacetal resin (A) which has been melted.

When in the second mode, the pre-mixture obtained through the first step is melted and kneaded with the remaining portion of the polyacetal resin (A), a ratio of the polyacetal resin used in the first step to the remaining portion of the polyacetal resin used in the second step is preferably from 1:45 to 1:5. Controlling the ratio to fall within this range tends to suppress shortage of kneading of the hydrazine derivative (B) and the compound (C) for lowering the melting point of the hydrazine derivative (B).

In the preparation process of the polyacetal resin composition according to the present embodiment, it is necessary to mix at least the hydrazine derivative (B) with the compound (C) for lowering the melting point of the hydrazine derivative (B) in advance and then melt and mix (knead) the pre-mixture with the polyacetal resin.

In the preparation process according to the present embodiment, the additive may be added in any one or more steps of the first, second, and third steps or may be added between any two of the steps.

The polyacetal resin composition prepared in the present embodiment is a resin composition particularly excellent in repeated impact resistance after aging and recycling moldability or formability.

The polyacetal resin (A), the hydrazine derivative (B), antioxidant, polymer or compound having a formaldehyde-reactive nitrogen, formic acid scavenger, mold release agent, other additives (inorganic filler, electroconductive agent, thermoplastic resin, thermoplastic elastomer, and pigment), and the molding or forming method and application of the polyacetal resin composition of the third embodiment, which are not described above, are similar to those of the polyacetal resin composition of the first embodiment so that detailed description on them is omitted here.

EXAMPLES

The present invention will hereinafter be described in further detail by Examples and Comparative Examples. It should however be borne in mind that the invention is not limited to or by them. Physical properties are measured in accordance with the methods described below.

<Measurement of Dimensional Stability (Secondary Shrinkage) after Aging>

The polyacetal resin compositions described later were molded by using an injecting molding machine ("SH-75", trade name; product of Sumitomo Heavy Industries) under injection conditions of an injection pressure of 70 MPa, injection time of 60 seconds, and cooling time of 15 seconds while setting a cylinder temperature at 200° C. and a mold temperature at 40° C. and ISO dumbbells for evaluation were obtained as polyacetal resin molded products. After completion of molding, the resulting dumbbells were each left to stand for 48 hours under an environment of 23° C. and humidity of 50%. The dimension of the resulting dumbbells in a flow direction was designated as D1 (mm). After completion of the molding, on the other hand, the dumbbells were each left to stand for 72 hours under an environment of 23° C. and humidity of 50%, heated at 120° C. for 48 hours, and then left to stand for 48 hours under an environment of 23° C. and humidity of 50%. The dimension of the resulting dumbbells in a flow direction was designated as D2 (mm). The second shrinkage was determined in accordance with the following equation (4).

$$\text{Second shrinkage (\%)} = (D1 - D2)/(\text{dimension of mold})_x 100 \quad (4)$$

<Measurement of Repeated Impact Resistance after Aging>

Figure 2:
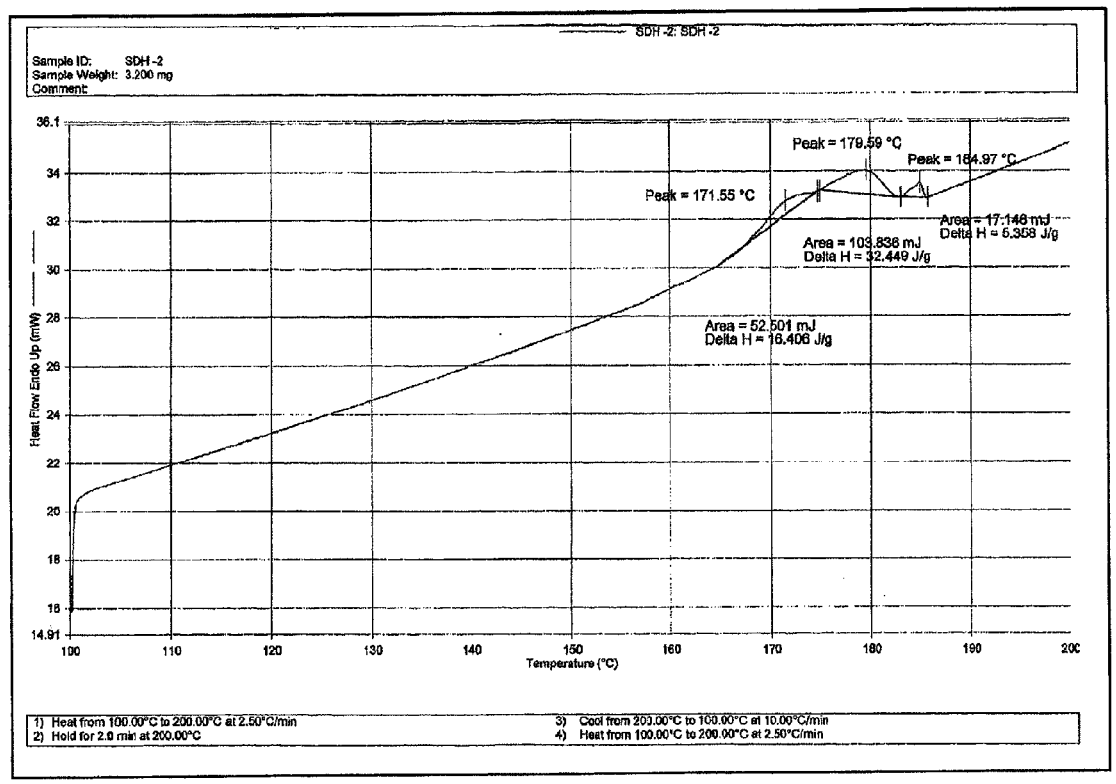
FIG. 2 is a chart showing the results of differential scanning calorimetry of sebacic acid dihydrazide.

The ISO dumbbells for evaluation thus obtained were suspended in a gear oven set at 160° C. and heated for 240 hours. Then, the dumbbell was taken out from the gear oven and left to stand for 24 hours in a temperature controlled room kept at 23° C. and humidity of 50%. The dumbbell was then cut into a long plate having a length of 80 mm, a width of 10 mm, and a thickness of 4 mm. A notch (edge R: 25 mm, notch width: 8 mm, notch depth: 2 mm) was formed at the center in the length direction of the plate to obtain a test piece. The resulting test piece was set in a measuring apparatus of repeated impact resistance ("AT repeated impact tester", trade name; product of Toyo Seiki Seisakusho) as indicated by numeral 3 of FIG. 2. A weight of 160 g was set in the apparatus as indicated by numeral 7 and dropped from the height of 20 mm. The weight was made to collide against the test piece in repetition to give repeated impact to the test piece. The frequency of impacts (collisions) to the test piece until the test piece was broken was counted. The greater the impact frequency until breakage, the better repeated impact resistance the test piece has. In FIG. 2, numeral 1 denotes a preset counter, 2 a dropping-height adjusting bolt, 3 a test piece, 4, a guide plate, 5 a guide rod, 6 a guide rod holder, 7 a weight, 8, a claw, 9 a stopper, and 10 a speed-adjusting finger grip.

<Evaluation of Recycling Moldability or Formability>

The polyacetal resin compositions described later were molded into predetermined test pieces by using an injection molding machine ("SH-75", trade name; product of Sumitomo Heavy industries) under injection conditions of an injection pressure of 70 MPa, injection time of 60 seconds, and cooling time of 15 seconds while setting a cylinder temperature at 205° C. and a mold temperature at 70° C. A test of recycling moldability or formability was performed by grinding each of the test pieces by using a V-shaped grinder and then molding the resulting ground product into a molded product. An amount (mg/kg) of formaldehyde emission from a molded product obtained by repeating molding 5 times and also that from a molded product obtained by repeating molding 10 times were determined. A method of determining the emission amount will next be described.

Each of the molded products was ground with a V-shaped grinder and the resulting ground product was molded into a test piece by using an injection molding machine ("SH-75", trade name; product of Sumitomo Heavy Industries) under the following conditions: cylinder temperature: 220° C., injection pressure (primary pressure/secondary pressure=63.7 MPa/50.0 MPa), injection time: 15 seconds, cooling time: 20 seconds, and mold temperature: 77° C. Formaldehyde emission from the resulting test piece was measured in accordance with the VDA 275 method, which will be described below, and was determined as an amount of formaldehyde emission from the molded product.

In the VDA 275 method, 50 mL of distilled water and a test piece having a specified size (100 mm long×40 mm wide×3 mm thick) were placed in a polyethylene container and the container was hermetically sealed. After the container was heated at 60° C. for 3 hours, formaldehyde in distilled water was reacted with acetylacetone in the presence of an ammonium ion. The absorption peak of the reaction product at a wavelength of 412 nm was measured by using a UV spectrometer and an amount (mg/kg) of formaldehyde emission was determined.

<Evaluation of Hot Water Resistance>

The polyacetal resin compositions described later were molded into a predetermined test piece by using an injection molding machine ("SH-75", trade name; product of Sumitomo Heavy Industries) under the conditions of an injection pressure of 70 MPa, an injection time of 60 seconds, and a cooling time of 15 seconds while setting a cylinder temperature at 205° C. and a mold temperature at 70° C. The test piece thus obtained was immersed in a batch-type water bath. After a hot water immersion test at 120° C. for 20 days, it was taken out from the water bath. The tensile elongation of the test piece before and after the hot water immersion test was measured in accordance with ISO527. When tensile elongation retention, that is, a ratio of tensile elongation before the hot water immersion test to tensile elongation after the hot water immersion test is 50% or greater, the test piece is graded as A and when test elongation retention is less than 50%, the test piece is graded as B. In this evaluation, grade A is superior to grade B in hot water resistance.

<Evaluation of Mold Deposit (MD)>

The polyacetal resin compositions described later were molded into an embossed test plate of 80 mm×80 mm with a thickness of 2 mm by using an injection molding machine ("IS-100GN", trade name; product of Toshiba Machine) under the conditions of an injection pressure of 60 MPa, an injection time of 60 seconds, and a cooling time of 15 seconds while setting a cylinder temperature at 170° C. and a mold temperature of 60° C. The above injection molding was performed using a short-shot method, that is, a method of molding while not completely filling a mold with a resin composition. The mass of the test piece was 95 mass % of a test piece obtained by filling the resin composition completely in a mold. The mold deposit (MD) in the mold was observed visually after 300 shots of test-piece molding. The test piece was graded as "A" when no MD was recognized, "B" when slight MD was recognized, and "C" when apparent deposit was recognized. In this evaluation, the amount of MD is excellent in the order of A, B, and C.

<Evaluation of Crack Generation Under Aging>

The polyacetal resin compositions described later were molded by using an injection molding machine ("SH-75", trade name; product of Sumitomo Heavy Industries) under the conditions of an injection pressure of 90 MPa, an injection time of 40 seconds, and a cooling time of 15 seconds while setting a cylinder temperature of 205° C. and a mold temperature of 90° C. and ISO dumbbells for evaluation were obtained as a molded product of a polyacetal resin. After completion of the injection molding, the molded products were each placed in a gear oven (product of Tabai Espec) adjusted to 150° C. and cracks generated on the surface of the molded product were observed visually. Time from placement of the product in the oven to generation of cracks was measured.

<Evaluation of Amount of Formaldehyde Generated after Sliding>

The polyacetal resin compositions described later were molded into cylindrical test pieces each having an outer diameter of 25.6 mm, an inner diameter of 20 mm, and height of 15 mm by using an injection molding machine ("SH-75", trade name; product of Sumitomo Heavy Industries) under the conditions of an injection pressure of 60 MPa, an injection time of 15 seconds and a cooling time of 15 seconds while setting a cylinder temperature at 205° C. and a mold temperature at 70° C. The test piece thus obtained was set at a predetermined position of a thrust direction friction and abrasion tester manufactured by Toyo Seiki Seisaku-sho and a sliding test was performed for 24 hours under an applied load of 4 kgf and at a sliding speed of 20 cm/sec. As a counterpart material of sliding used for the sliding test, used was a cylindrical molded product obtained by molding a polyacetal resin (a-1) or a polyacetal resin (a-2) described later in a similar manner to that of the above test piece. The amount (mg/kg) of formaldehyde emission from the test piece after the sliding test was derived in the following manner.

Formaldehyde emitted from the test piece thus obtained was measured by the following VDA 275 method and it was determined as the amount of formaldehyde emission from the molded product.

In the VDA 275 method, 15 mL of distilled water and the test piece after sliding were placed in a polyethylene container and the container was hermetically sealed. After the container was heated at 60° C. for 3 hours, formaldehyde in distilled water was reacted with acetylacetone in the presence of an ammonium ion. The absorption peak of the reaction product at a wavelength of 412 nm was measured by using a UV spectrometer and an amount (mg/kg) of formaldehyde emission was determined.

[Polyacetal Resin Composition]

In Examples and Comparative Examples, the following components were used as components contained in the polyacetal resin composition.

<Polyacetal Resin (a-1)>

A self-cleaning type twin-screw polymerizer (L/D=8) equipped with a jacket and permitting passage of a heat medium was adjusted to 80° C. Then, 4 kg/hr of trioxane, 42.8 g/hr (0.039 mol per mol of trioxane) of 1,3-dioxolane as a comonomer, and $1.50 \times 10^{-3}$ mol, per mol of trioxane, of methylal (water content: 1.3%, methanol content: 0.99%) as a chain transfer agent were added successively. In addition, boron trifluoride di-n-butyl etherate as a polymerization catalyst was added successively in an amount of $1.5 \times 10^{-5}$ mol per mol of trioxane to effect polymerization. The polyacetal copolymer discharged from the polymerizer was put into a 0.1% aqueous solution of triethylamine to deactivate the polymerization catalyst. The polyacetal copolymer after deactivation of the polymerization catalyst was filtered by using a centrifugal separator. To 100 parts by mass of the polyacetal copolymer thus separated and collected was added 1 part by mass of an aqueous solution containing, as a quaternary ammonium compound, choline hydroxide formate (triethyl-2-hydroxyethylammonium formate), followed by uniform mixing and then drying at 120° C. An amount of the choline hydroxide formate to be added was adjusted by controlling the concentration of the choline hydroxide formate contained in the aqueous solution containing the choline hydroxide formate. Choline hydroxide formate was added in an amount of 20 mass ppm in terms of nitrogen derived from the choline hydroxide formate represented by the above formula (8). The polyacetal copolymer after drying was supplied to a twin-screw extruder equipped with a vent and 0.5 part by mass of water was added to 100 parts by mass of the polyacetal copolymer melted in the extruder. An unstable terminal portion was decomposed and removed by retaining it for 7 minutes in the extruder while setting the temperature of the extruder at 200° C. The polyacetal copolymer from which the unstable terminal portion had been decomposed and removed was degassed under a vent vacuum degree of 20 Torr, extruded from the dice portion of the extruder as a strand, and pelletized. In such a manner, a polyacetal resin (a-1) in pellet form was obtained. The melt index of the resulting polyacetal resin (a-1) was measured in accordance with ASTM-D1238. As a result, it was 9 g/10 minute under the conditions of 190° C. and 2169 g (measurement of a melt index will hereinafter be conducted in a similar manner). Further, the polyacetal resin (a-1) was heated to 200° C. at a heating rate of 320° C./min, maintained at 200° C. for 2 minutes, cooled to 100° C. at a cooling rate of 10° C./min, and then heated at a heating rate of 2.5° C./min by using a differential scanning calorimeter ("DSC7", trade name; product of Perkin Elmer) and it was found that the melting point (which will equally apply hereinafter) of the polyacetal resin was 165° C.

<Polyacetal Resin (a-2)>

In a similar manner to that employed for the preparation of the polyacetal resin (a-1) except that the amount of methylal as a chain transfer agent was changed to give a melt index of 40 g/10 min, a polyacetal resin (a-2) was obtained. The resulting resin was found to have a melting point of 165° C.

<Polyacetal Resin (a-3)>

In a similar manner to that employed for the preparation of the polyacetal resin (a-1) except that the methylal used as a chain transfer agent was replaced with methylal (water content: 45 ppm, methanol content: 0.58%), a polyacetal resin (a-3) was obtained. The resulting resin was found to have a melting point of 165° C.

<Polyacetal Resin (a-4)>

A self-cleaning type twin-screw polymerizer (L/D=8) equipped with a jacket and permitting passage of a heat medium was adjusted to 80° C. Then, 4 kg/hr of trioxane and 42.8 g/hr (0.039 mol per mol of trioxane) of 1,3-dioxolane as a comonomer were added successively. Further, boron trifluoride di-n-butyl etherate was added as a polymerization catalyst continuously in an amount of $1.5 \times 10^{-5}$ mol per of trioxane to effect polymerization. To 1000 parts of crude polyacetal thus obtained was added 0.8 part of triphenylphosphine, followed by uniform mixing to obtain a polyacetal resin (a-4). The resin was found to have a melting point of 165° C.

<Polyacetal Resin (a-5)>

A self-cleaning type twin-screw polymerizer (L/D=8) equipped with a jacket and permitting passage of a heat medium was adjusted to 80° C. Then, 4 kg/hr of trioxane, 14.3 g/hr (0.0013 mol per mol of trioxane) of 1,3-dioxolane as a comonomer, and $0.18 \times 10^{-3}$ mol, per mol of trioxane, of methylal (water content: 1.3%, methanol content: 0.99%) as a chain transfer agent were added successively. In addition, boron trifluoride di-n-butyl etherate was added successively as a polymerization catalyst in an amount of $1.5 \times 10^{-5}$ mol per mol of trioxane to effect polymerization. The polyacetal copolymer discharged from the polymerizer was poured into a 0.1% aqueous solution of triethylamine to deactivate the polymerization catalyst. The polyacetal copolymer after deactivation of the polymerization catalyst was filtered by using a centrifugal separator. To 100 parts by mass of the polyacetal copolymer thus separated and collected was added 1 part by mass of an aqueous solution containing choline hydroxide formate (triethyl-2-hydroxyethylammonium formate) as a quaternary ammonium compound, followed by uniform mixing and then drying at 120° C. An amount of the choline hydroxide formate to be added was adjusted by controlling the concentration of the choline hydroxide formate in the aqueous solution containing the choline hydroxide formate. The choline hydroxide formate was added in an amount of 20 mass ppm in terms of nitrogen derived from the choline hydroxide formate represented by the above formula (8). The polyacetal copolymer after drying was supplied to a twin-screw extruder equipped with a vent and 0.5 part by mass of water was added to 100 parts by mass of the polyacetal copolymer melted in the extruder. An unstable terminal portion was decomposed and removed by retaining it for 7 minutes in the extruder while setting the temperature of the extruder at 200° C. The polyacetal copolymer from which the unstable terminal portion had been decomposed and removed was degassed under a vent vacuum degree of 20 Torr, extruded from the dice portion of the extruder as a strand, and pelletized. A polyacetal resin (a-5) thus obtained was found to have a melting point of 169.5° C.

<Hydrazine Derivative (B) and Compound (C) for Lowering the Melting Point of Hydrazine Derivative (B)>

As a carboxylic acid hydrazide (b-1), a carboxylic acid hydrazide (bc-2), a carboxylic acid hydrazide (bc-3), a carboxylic acid hydrazide (bc-4), and a carboxylic acid hydrazide (bc-5), adipic acid dihydrazide, sebacic acid hydrazide, dodecanedioic acid dihydrazide, isophthalic acid dihydrazide, and tetraphthalic acid dihydrazide were prepared, respectively. They were used as the hydrazine derivative (B) and/or the compound (C) for lowering the melting point of the hydrazine derivative (B).

In addition, a temperature (main peak temperature of melting point) (° C.) showing an apex of an endothermic peak having the maximum endothermic capacity among endothermic peaks obtained by, with a differential scanning calorimeter ("DSC7", trade name; product of Perkin Elmer), heating and cooling each of the above carboxylic acid hydrazides alone in accordance with a predetermined temperature program and then heating at a rate of 2.5° C./min was measured. The term "predetermined temperature program" described above means a temperature program in which the compound is heated from a temperature lower than the endothermic peak of the compound to a fusing temperature of the compound at a heating rate of 2.5° C./min, keeping it at the temperature for 2 minutes, and then cooling it at a cooling rate of 10° C./min to 100° C. The results are shown in Table 1.

TABLE 1

| Hydrazine derivative (B) and Compound (C) | | Main peak temperature (° C.) of melting point |
|---|---|---|
| (bc-1) | Adipic acid dihydrazide | 171 |
| (bc-2) | Sebacic acid dihydrazide | 180 |
| (bc-3) | Dodecanedioic acid dihydrazide | 171 |
| (bc-4) | Isophthalic acid dihydrazide | None |
| (bc-5) | Terephthalic acid dihydrazide | None |

<Polyalkylene Glycol (D)>

As the polyalkylene glycol (D), polyethylene glycol (d-1) having a number average molecular weight of 400 and polyethylene glycol (d-2) having a number average molecular weight of 8500 were prepared.

<Formic Acid Scavenger (E)>

As a formic acid scavenger (e-1), calcium distearate was prepared, while as a formic acid scavenger (e-2), magnesium silicate was prepared.

<Mold Release Agent (F)>

As the mold release agent (f), ethylene glycol distearate was prepared.

<Polymer or Compound (G) Having Formaldehyde-Reactive Nitrogen>

As the polymer (g) having a formaldehyde-reactive nitrogen, Nylon 6-6 was prepared.

<Antioxidant (H)>

As the antioxidant (h), triethylene glycol bis[3-(3-t-butyl-5-methyl-4-hydroxyphenyl)propionate] was prepared.

[Vented Twin-Screw Extruder]

In Examples and Comparative Examples, "TEM26SS" manufactured by Toshima Machine was used as the vented twin-screw extruder.

Examples 1 to 13

In each Example, a raw material composition was obtained by adding, to 100 parts by mass of the polyacetal resin (a-1), (a-2), (a-3), or (a-4), the hydrazine derivative (B) and the compound (C) for lowering the melting point of the hydrazine derivative (B), each selected from the carboxylic acid hydrazides (bc-1), (bc-2), and (bc-3), at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners.

The main peak temperature of the melting point when a mixture of the hydrazine derivative (B) and the compound (C) for lowering the melting point of the hydrazine derivative (B) used in each of the examples was subjected to the differential scanning calorimetry was shown in Table 2.

Examples 14 and 15

In each Example, a raw material composition was obtained by adding, to 100 parts by mass of the polyacetal resin (a-1), 0.3 part by mass of triethylene glycol bis[3-(3-t-butyl-5-methyl-4-hydroxyphenyl)propionate] and the carboxylic acid hydrazides (b-1) and (b-2) at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners.

The main peak temperature of the melting point when a mixture of the hydrazine derivative (B) and the compound (C) for lowering the melting point of the hydrazine derivative (B) used in each of the examples was subjected to the differential scanning calorimetry was shown in Table 2.

Example 16

A raw material composition was obtained by adding, to 100 parts by mass of the polyacetal resin (a-1), 0.3 part by mass of triethylene glycol bis[3-(3-t-butyl-5-methyl-4-hydroxyphenyl)propionate] as the antioxidant (h), 0.15 part by mass of calcium distearate as the formic acid scavenger (e-1), and the carboxylic acid hydrazides (bc-1) and (bc-2) at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners. The main peak temperature of the melting point when a mixture of the hydrazine derivative (B) and the compound (C) for lowering the melting point of the hydrazine derivative (B) used was subjected to the differential scanning calorimetry was shown in Table 2.

Example 17

A raw material composition was obtained by adding, to 100 parts by mass of the polyacetal resin (a-1), 0.3 part by mass of triethylene glycol bis[3-(3-t-butyl-5-methyl-4-hydroxyphenyl)propionate] as the antioxidant (h), 0.15 part by mass of calcium distearate as the formic acid scavenger (e-1), 0.03 part by mass of ethylene glycol distearate as the mold release agent (f) and the carboxylic acid hydrazides (bc-1) and (bc-2) at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners. The main peak temperature of the melting point when a mixture of the hydrazine derivative (B) and the compound (C) for lowering the melting point of the hydrazine derivative (B) used was subjected to the differential scanning calorimetry was shown in Table 2.

Example 18

A raw material composition was obtained by adding, to 100 parts by mass of the polyacetal resin (a-1), 0.3 part by mass of triethylene glycol bis[3-(3-t-butyl-5-methyl-4-hydroxyphenyl)propionate] as the antioxidant (h), 0.15 part by mass of calcium distearate as the formic acid scavenger (e-1), 0.03 part by mass of ethylene glycol distearate as the mold release agent (f), 0.05 part by mass of Nylon 6-6 as the polymer (g) having a formaldehyde reactive nitrogen (g), and the carboxylic acid hydrazides (bc-1) and (bc-2) at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners. The main peak temperature of the melting point when a mixture of the hydrazine derivative (B) and the compound (C) for lowering the melting point of the hydrazine derivative (B) used was subjected to the differential scanning calorimetry was shown in Table 2.

Example 19

A raw material composition was obtained by adding, to 100 parts by mass of the polyacetal resin (a-1), 0.3 part by mass of triethylene glycol bis[3-(3-t-butyl-5-methyl-4-hydroxyphenyl)propionate] as the antioxidant (h), 0.01 part by mass of magnesium silicate as the formic acid scavenger (e-2), 0.03 part by mass of ethylene glycol distearate as the mold release agent (f), 0.05 part by mass of Nylon 6-6 as the polymer (g) containing a formaldehyde-reactive nitrogen, and the carboxylic acid hydrazides (bc-1) and (bc-2) at the proportion shown in Table 2 and mixing them in a tumbler. The resulting raw material composition was melted and kneaded at 200° C. in a twin-screw extruder equipped with a vent to obtain pellets of a polyacetal resin composition. The pellets thus obtained were measured for dimensional stability after aging and repeated impact resistance after aging and evaluated for formability or moldability upon recycling, hot water resistance, and the amount of MD in the above-described manners. The main peak temperature of the melting point when a mixture of the hydrazine derivative (B) and the compound (C) for lowering the melting point of the hydrazine derivative (B) used was subjected to the differential scanning calorimetry was shown in Table 2.

Comparative Example 1

Pellets of a polyacetal resin composition were prepared by melting and kneading 100 parts by mass of the polyacetal resin (a-1) in a twin-screw extruder equipped with a vent. The pellets thus obtained were measured for dimensional stability after aging and repeated impact resistance after aging and evaluated for formability or moldability upon recycling, hot water resistance, and the amount of MD.

Comparative Example 2

In a similar manner to Comparative Example 1 except for the use of the polyacetal resin (a-2) instead of the polyacetal resin (a-1), pellets of a polyacetal resin composition were prepared. The pellets thus obtained were measured for dimensional stability after aging and repeated impact resistance after aging and evaluated for formability or moldability upon recycling, hot water resistance, and the amount of MD in the above-described manners.

Comparative Example 3

In a similar manner to Comparative Example 1 except for the use of the polyacetal resin (a-3) instead of the polyacetal resin (a-1), pellets of a polyacetal resin composition were prepared. The pellets thus obtained were measured for dimensional stability after aging and repeated impact resistance after aging and evaluated for formability or moldability upon recycling, hot water resistance, and the amount of MD in the above-described manners.

Comparative Example 4

In a similar manner to Comparative Example 1 except for the use of the polyacetal resin (a-4) instead of the polyacetal resin (a-1), pellets of a polyacetal resin composition were prepared. The pellets thus obtained were measured for dimensional stability after aging and repeated impact resistance after aging and evaluated for formability or moldability upon recycling, hot water resistance, and the amount of MD in the above-described manners.

Comparative Examples 5 to 12

In each Comparative Example, a raw material composition was obtained by adding, to 100 parts by mass of the polyacetal resin (a-1), one or two of the carboxylic acid hydrazides (bc-1), (bc-2), (bc-4), and (bc-5) at the proportion shown in Table 3 and mixing them in a tumbler. The resulting raw material composition was melted and kneaded at 200° C. in a twin-screw extruder equipped with a vent to prepare pellets of a polyacetal resin composition. The pellets thus obtained were measured for dimensional stability after aging and repeated impact resistance after aging and evaluated for formability or moldability upon recycling, hot water resistance, and the amount of MD in the above-described manners. The main peak temperature of the melting point of the carboxylic acid hydrazide alone in Comparative Example 5 was 171° C. and that in Comparative Example 12 was 180° C. In Comparative Examples 6 to 9, the mixture of two carboxylic acid hydrazides did not have a main peak temperature of the melting point when it was subjected to the above-described differential scanning calorimetry. The main peak temperatures of the mixtures of two carboxylic acid hydrazides used in Comparative Examples 10 and 11 were shown in Table 3.

The compositions of the polyacetal resin compositions obtained in Examples 1 to 19 and Comparative Examples 1 to 12 are shown in Tables 2 and 3 and evaluation results of dimensional stability after aging, repeated impact resistance after aging, recycling moldability or formability, that is, an amount of formaldehyde emission from a molded or formed product, hot water resistance, and the amount of MD are shown in Table 4.

From the results shown in the tables, it has been understood that the polyacetal resin compositions according to the present invention are excellent in mold deposit resistance, hot water resistance, and repeated impact resistance even under conditions where second shrinkage property and fill ratio into a mold are low. It has also been found that the molded or formed product composed of the polyacetal resin composition of the present invention has excellent recycling moldability or formability because an amount of formaldehyde emission after recycling molding or formation is kept at a markedly low level.

TABLE 2

| | Polyacetal resin (A) | | Hydrazide derivative (B) | | Compound (C) | | | | Main peak temperature ° C. | Additive | |
|---|---|---|---|---|---|---|---|---|---|---|---|
| | Kind | Parts by mass | Kind | Part by mass | Kind | Parts by mass | Kind | Part by mass | | Kind | Part by mass |
| Ex. 1 | a-1 | 100 | bc-1 | 0.075 | bc-2 | 0.075 | — | — | 154 | — | — |
| Ex. 2 | a-2 | 100 | bc-1 | 0.075 | bc-2 | 0.075 | — | — | 154 | — | — |
| Ex. 3 | a-1 | 100 | bc-2 | 0.075 | bc-3 | 0.075 | — | — | 144 | — | — |
| Ex. 4 | a-1 | 100 | bc-1 | 0.07 | bc-2 | 0.07 | bc-3 | 0.01 | 154 | — | — |
| Ex. 5 | a-1 | 100 | bc-1 | 0.075 | bc-3 | 0.075 | — | — | 151 | — | — |
| Ex. 6 | a-1 | 100 | bc-1 | 0.105 | bc-2 | 0.045 | — | — | 148 | — | — |
| Ex. 7 | a-1 | 100 | bc-1 | 0.045 | bc-2 | 0.105 | — | — | 150 | — | — |

TABLE 2-continued

| | Polyacetal resin (A) | | Hydrazide derivative (B) | | Compound (C) | | | | Main peak temperature °C. | Additive | |
|---|---|---|---|---|---|---|---|---|---|---|---|
| | Kind | Parts by mass | Kind | Part by mass | Kind | Parts by mass | Kind | Part by mass | | Kind | Part by mass |
| Ex. 8 | a-1 | 100 | bc-1 | 0.112 | bc-2 | 0.038 | — | — | 164 | — | — |
| Ex. 9 | a-1 | 100 | bc-1 | 0.038 | bc-2 | 0.112 | — | — | 164 | — | — |
| Ex. 10 | a-1 | 100 | bc-1 | 0.02 | bc-2 | 0.02 | — | — | 154 | — | — |
| Ex. 11 | a-1 | 100 | bc-1 | 0.09 | bc-2 | 0.09 | — | — | 154 | — | — |
| Ex. 12 | a-3 | 100 | bc-1 | 0.075 | bc-2 | 0.075 | — | — | 154 | — | — |
| Ex. 13 | a-4 | 100 | bc-1 | 0.075 | bc-2 | 0.075 | — | — | 154 | — | — |
| Ex. 14 | a-1 | 100 | bc-1 | 0.075 | bc-2 | 0.0.75 | — | — | 154 | — | — |
| Ex. 15 | a-1 | 100 | bc-1 | 0.105 | bc-2 | 0.045 | — | — | 148 | h | 0.30 |
| Ex. 16 | a-1 | 100 | bc-1 | 0.075 | bc-2 | 0.075 | — | — | 154 | h | 0.30 |
| | | | | | | | | | | e-1 | 0.15 |
| Ex. 17 | a-1 | 100 | bc-1 | 0.075 | bc-2 | 0.075 | — | — | 154 | h | 0.30 |
| | | | | | | | | | | e-1 | 0.15 |
| | | | | | | | | | | f | 0.03 |
| Ex. 18 | a-1 | 100 | bc-1 | 0.075 | bc-2 | 0.075 | — | — | 154 | h | 0.30 |
| | | | | | | | | | | e-1 | 0.15 |
| | | | | | | | | | | f | 0.03 |
| | | | | | | | | | | g | 0.05 |
| Ex. 19 | a-1 | 100 | bc-1 | 0.075 | bc-2 | 0.075 | — | — | 154 | h | 0.30 |
| | | | | | | | | | | e-2 | 0.01 |
| | | | | | | | | | | f | 0.03 |
| | | | | | | | | | | g | 0.05 |

TABLE 3

| | Polyacetal resin (A) | | Carboxylic acid hydrazide | | | | | | Main peak temperature °C. |
|---|---|---|---|---|---|---|---|---|---|
| | Kind | Parts by mass | Kind | Part by mass | Kind | Part by mass | Kind | Part by mass | |
| Comp. Ex. 1 | a-1 | 100 | — | — | — | — | — | — | — |
| Comp. Ex. 2 | a-2 | 100 | — | — | — | — | — | — | — |
| Comp. Ex. 3 | a-3 | 100 | — | — | — | — | — | — | — |
| Comp. Ex. 4 | a-4 | 100 | — | — | — | — | — | — | — |
| Comp. Ex. 5 | a-1 | 100 | bc-1 | 0.15 | — | — | — | — | 171 |
| Comp. Ex. 6 | a-1 | 100 | bc-1 | 0.075 | bc-4 | 0.075 | — | — | None |
| Comp. Ex. 7 | a-1 | 100 | bc-2 | 0.075 | bc-4 | 0.075 | — | — | None |
| Comp. Ex. 8 | a-1 | 100 | bc-1 | 0.075 | bc-5 | 0.075 | — | — | None |
| Comp. Ex. 9 | a-1 | 100 | bc-4 | 0.075 | bc-5 | 0.075 | — | — | None |
| Comp. Ex. 10 | a-1 | 100 | bc-1 | 0.015 | bc-2 | 0.135 | — | — | 172 |
| Comp. Ex. 11 | a-1 | 100 | bc-1 | 0.135 | bc-2 | 0.015 | — | — | 168 |
| Comp. Ex. 12 | a-1 | 100 | bc-2 | 0.15 | — | — | — | — | 180 |

TABLE 4

| | Dimensional stability after aging (%) | Repeated impact resistance after aging (frequency) | Recycling moldability or formability | | Hot water resistance | Amount of MD |
|---|---|---|---|---|---|---|
| | | | 5 times Amount of formaldehyde emission (mg/kg) | 10 times Amount of formaldehyde emission (mg/kg) | | |
| Ex. 1 | 0.05 | 3583 | 0.95 | 1.73 | A | A |
| Ex. 2 | 0.10 | 919 | 0.95 | 1.73 | A | A |
| Ex. 3 | 0.05 | 3551 | 0.95 | 1.73 | A | A |
| Ex. 4 | 0.05 | 3561 | 0.95 | 1.74 | A | A |
| Ex. 5 | 0.08 | 3339 | 1.19 | 2.16 | A | A |
| Ex. 6 | 0.06 | 3445 | 0.96 | 1.77 | A | A |
| Ex. 7 | 0.08 | 3438 | 1.11 | 1.94 | A | A |
| Ex. 8 | 0.06 | 3439 | 1.16 | 2.03 | A | A |
| Ex. 9 | 0.06 | 3416 | 1.13 | 2.03 | A | A |
| Ex. 10 | 0.10 | 3458 | 1.19 | 2.15 | A | A |
| Ex. 11 | 0.06 | 3635 | 0.92 | 1.62 | A | A |
| Ex. 12 | 0.04 | 3642 | 0.90 | 1.58 | A | A |
| Ex. 13 | 0.09 | 3307 | 1.19 | 2.21 | A | A |
| Ex. 14 | 0.04 | 3655 | 0.95 | 1.66 | A | A |
| Ex. 15 | 0.04 | 3641 | 0.95 | 1.67 | A | A |
| Ex. 16 | 0.04 | 3672 | 0.95 | 1.67 | A | A |

TABLE 4-continued

| | Dimensional stability after aging (%) | Repeated impact resistance after aging (frequency) | Recycling moldability or formability | | Hot water resistance | Amount of MD |
|---|---|---|---|---|---|---|
| | | | 5 times Amount of formaldehyde emission (mg/kg) | 10 times Amount of formaldehyde emission (mg/kg) | | |
| Ex. 17 | 0.04 | 3545 | 0.92 | 1.61 | A | A |
| Ex. 18 | 0.04 | 3687 | 0.90 | 1.59 | A | A |
| Ex. 19 | 0.04 | 3738 | 0.90 | 1.58 | A | A |
| Comp. Ex. 1 | 0.24 | 1516 | 1.41 | 4.10 | A | A |
| Comp. Ex. 2 | 0.30 | 429 | 1.43 | 4.14 | A | A |
| Comp. Ex. 3 | 0.22 | 1734 | 1.38 | 3.96 | A | C |
| Comp. Ex. 4 | 0.27 | 1379 | 1.56 | 4.72 | A | C |
| Comp. Ex. 5 | 0.10 | 2948 | 1.26 | 2.72 | B | C |
| Comp. Ex. 6 | 0.10 | 3090 | 1.29 | 2.67 | B | C |
| Comp. Ex. 7 | 0.10 | 3192 | 1.34 | 2.66 | A | C |
| Comp. Ex. 8 | 0.10 | 3219 | 1.26 | 2.66 | B | C |
| Comp. Ex. 9 | 0.10 | 3366 | 1.34 | 2.64 | A | C |
| Comp. Ex. 10 | 0.11 | 2953 | 1.14 | 2.20 | B | C |
| Comp. Ex. 11 | 0.13 | 2968 | 1.19 | 2.59 | B | C |
| Comp. Ex. 12 | 0.14 | 2972 | 1.01 | 2.03 | A | C |

Examples 20 to 36

In each Example, to 100 parts by mass of the polyacetal resin (a-1) or (a-2) were added the hydrazine derivative (B) and the compound (C) for lowering the melting point of the hydrazine derivative (B) selected from the carboxylic acid hydrazides (bc-1), (bc-2), and (bc-3) and the polyalkylene glycol (d-1) or (d-2) at the proportion shown in Table 5, followed by mixing in a tumbler. The resulting mixture was melted and kneaded in a twin-screw extruder equipped with a vent to obtain pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-2) was used a counterpart material in the sliding test in Examples 21 and 23, while the polyacetal resin (a-1) was used in the other Examples. The main peak temperature of the melting point when a mixture of the hydrazine derivative (B) and the compound (C) for lowering the melting point of the hydrazine derivative (B) used in each of the Example was subjected to the above-described differential scanning calorimetry was shown in Table 5.

Example 37

To 100 parts by mass of the polyacetal resin (a-1) were added 0.075 part by mass of the hydrazine derivative (bc-1), 0.075 part by mass of the compound (bc-2) for lowering the melting point of the hydrazine derivative (B), 0.3 part by mass of the polyalkylene glycol (d-1), and 0.15 part by mass of calcium distearate as the formic acid scavenger (e-1), followed by mixing in a tumbler. The resulting mixture was melted and kneaded in a twin-screw extruder equipped with a vent to prepare pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-1) was used as a counterpart material in the sliding test. The main peak temperature of the melting point of a mixture of the hydrazine derivative (B) and the compound (C) for lowering the melting point of the hydrazine derivative (B) used in the present example was 154° C.

Example 38

To 100 parts by mass of the polyacetal resin (a-1) were added 0.075 part by mass of the hydrazine derivative (bc-1), 0.075 part by mass of the compound (bc-2) for lowering the melting point of the hydrazine derivative (B), 0.3 part by mass of the polyalkylene glycol (d-1), 0.15 part by mass of calcium distearate as the formic acid scavenger (e-1), and 0.03 part by mass of ethylene glycol distearate as the mold release agent (f), followed by mixing in a tumbler. The resulting mixture was melted and kneaded in a twin-screw extruder equipped with a vent to obtain pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-1) was used as a counterpart material in the sliding test. The main peak temperature of the melting point of a mixture of the hydrazine derivative (B) and the compound (C) for lowering the melting point of the hydrazine derivative (B) used in the present example was 154° C.

Example 39

To 100 parts by mass of the polyacetal resin (a-1) were added 0.075 part by mass of the hydrazine derivative (bc-1), 0.075 part by mass of the compound (bc-2) for lowering the melting point of the hydrazine derivative (B), 0.3 part by mass of the polyalkylene glycol (d-1), 0.15 part by mass of calcium distearate as the formic acid scavenger (e-1), 0.03 part by mass of ethylene glycol distearate as the mold release agent (f), and 0.05 part by mass of Nylon 6-6 as the polymer (g) having a formaldehyde-reactive nitrogen, followed by mixing in a tumbler. The resulting mixture was melted and kneaded in a twin-screw extruder equipped with a vent to prepare pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-1) was used as a counterpart material in the sliding test. The main peak temperature of the melting point of a mixture of the hydrazine derivative (B) and the compound (C) for lowering the melting point of the hydrazine derivative (B) used in the present example was 154° C.

Example 40

To 100 parts by mass of the polyacetal resin (a-1) were added 0.075 part by mass of the hydrazine derivative (bc-1), 0.075 part by mass of the compound (bc-2) for lowering the melting point of the hydrazine derivative (B), 0.3 part by mass of the polyalkylene glycol (d-1), 0.15 part by mass of calcium distearate as the formic acid scavenger (e-1), 0.03 part by mass of ethylene glycol distearate as the mold release agent (f), 0.05 part by mass of Nylon 6-6 as the polymer (g) having a formaldehyde-reactive nitrogen, and 0.3 part by mass of triethylene glycol bis[3-(3-t-butyl-5-methyl-4-hydroxyphenyl)propionate] as the antioxidant (h), followed by mixing in a tumbler. The resulting mixture was melted and kneaded in a twin-screw extruder equipped with a vent to prepare pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-1) was used as a counterpart material in the sliding test. The main peak temperature of the melting point of a mixture of the hydrazine derivative (B) and the compound (C) for lowering the melting point of the hydrazine derivative (B) used in the present example was 154° C.

Example 41

To 100 parts by mass of the polyacetal resin (a-1) were added 0.075 part by mass of the hydrazine derivative (bc-1), 0.075 part by mass of the compound (bc-2) for lowering the melting point of the hydrazine derivative (B), 0.3 part by mass of the polyalkylene glycol (d-1), 0.01 part by mass of magnesium silicate as the formic acid scavenger (e-2), 0.03 part by mass of ethylene glycol distearate as the mold release agent (f), 0.05 part by mass of Nylon 6-6 as the polymer (g) having a formaldehyde-reactive nitrogen, and 0.3 part by mass of triethylene glycol bis[3-(3-t-butyl-5-methyl-4-hydroxyphenyl)propionate] as the antioxidant (h), followed by mixing in a tumbler. The resulting mixture was melted and kneaded in a twin-screw extruder equipped with a vent to prepare pellets of a polyacetal resin composition. The resulting pellets were evaluated for crack generation under aging, an amount of formaldehyde emission from the test piece after sliding, and the amount of MD in the above-described manners. It is to be noted that upon evaluation of the amount of formaldehyde emission, the polyacetal resin (a-1) was used as a counterpart material in the sliding test. The main peak temperature of the melting point of a mixture of the hydrazine derivative (B) and the compound (C) for lowering the melting point of the hydrazine derivative (B) used in the present example was 154° C.

Comparative Example 1

The pellets obtained in the above Comparative Example 1 were evaluated for crack generation under aging, an amount of formaldehyde generated after sliding, and the amount of MD in the above-described manners. Upon evaluation of the amount of formaldehyde generated after sliding, the polyacetal resin (a-1) was used as a counterpart material in the sliding test.

Comparative Example 2

The pellets obtained in the above Comparative Example 2 were evaluated for crack generation under aging, an amount of formaldehyde generated after sliding, and the amount of MD in the above-described manners. Upon evaluation of the amount of formaldehyde generated after sliding, the polyacetal resin (a-2) was used as a counterpart material in the sliding test.

Comparative Examples 13 to 24

In each comparative example, to 100 parts by mass of the polyacetal resin (a-1) or (a-2) were added the hydrazine derivative (B) and the compound (C) for lowering the melting point of the hydrazine derivative (B) each selected from the carboxylic acid hydrazides (bc-1), (bc-2), (bc-4), and (bc-5), and the polyalkylene glycol (d-1) at proportion shown in Table 6, followed by mixing in a tumbler. The resulting mixture was melted and kneaded in a twin-screw extruder equipped with a vent to prepare pellets of a polyacetal resin composition. The resulting pellets were evaluated for crack generation under aging, an amount of formaldehyde generated after sliding, and the amount of MD in the above-described manners. It is to be noted that upon evaluation of the amount of formaldehyde generated after sliding, the polyacetal resin (a-2) was used as a counterpart material in the sliding test. The main peak temperature of the melting point when a mixture of the hydrazine derivative (B) and the compound (C) for lowering the melting point of the hydrazine derivative (B) was subjected to the above-described differential scanning calorimetry is shown in Table 6.

The composition of each of the polyacetal resin compositions obtained in Examples 20 to 41 and Comparative Examples 1, 2, and 13 to 24 is shown in Tables 5 and 6 and evaluation results of crack generation under aging, an amount of formaldehyde generated after sliding, and the amount of MD are shown in Table 7.

From the results shown in the tables, it has been found that the polyacetal resin compositions according to the present invention generate a reduced amount of formaldehyde after sliding, suppress crack generation under aging, and are excellent in reducing mold deposit under the condition of a low resin filling rate in a mold.

TABLE 5

| | Polyacetal resin (A) | | Hydrazine derivative (B) | | Compound (C) | | | | Main peak temperature ° C. | Polyalkylene glycol (D) | | Additive | |
|---|---|---|---|---|---|---|---|---|---|---|---|---|---|
| | Kind | Parts by mass | Kind | Part by mass | Kind | Part by mass | Kind | Part by mass | | Kind | Part by mass | Kind | Part by mass |
| Ex. 20 | a-1 | 100 | bc-1 | 0.075 | bc-2 | 0.075 | — | — | 154 | d-1 | 0.3 | — | — |
| Ex. 21 | a-2 | 100 | bc-1 | 0.075 | bc-2 | 0.075 | — | — | 154 | d-1 | 0.3 | — | — |
| Ex. 22 | a-1 | 100 | bc-1 | 0.075 | bc-2 | 0.075 | — | — | 154 | d-2 | 0.3 | — | — |
| Ex. 23 | a-2 | 100 | bc-1 | 0.075 | bc-2 | 0.075 | — | — | 154 | d-2 | 0.3 | — | — |
| Ex. 24 | a-1 | 100 | bc-1 | 0.075 | bc-2 | 0.075 | — | — | 154 | d-1 | 3 | — | — |
| Ex. 25 | a-1 | 100 | bc-1 | 0.07 | bc-2 | 0.07 | bc-3 | 0.01 | 154 | d-1 | 0.3 | — | — |
| Ex. 26 | a-1 | 100 | bc-2 | 0.075 | bc-3 | 0.075 | — | — | 144 | d-1 | 0.3 | — | — |
| Ex. 27 | a-1 | 100 | bc-1 | 0.075 | bc-3 | 0.075 | — | — | 151 | d-1 | 0.3 | — | — |
| Ex. 28 | a-1 | 100 | bc-1 | 0.105 | bc-2 | 0.045 | — | — | 148 | d-1 | 0.3 | — | — |
| Ex. 29 | a-1 | 100 | bc-1 | 0.045 | bc-2 | 0.105 | — | — | 150 | d-1 | 0.3 | — | — |
| Ex. 30 | a-1 | 100 | bc-1 | 0.112 | bc-2 | 0.038 | — | — | 164 | d-1 | 0.3 | — | — |
| Ex. 31 | a-1 | 100 | bc-1 | 0.038 | bc-2 | 0.112 | — | — | 164 | d-1 | 0.3 | — | — |
| Ex. 32 | a-1 | 100 | bc-1 | 0.015 | bc-2 | 0.015 | — | — | 154 | d-1 | 0.16 | — | — |

TABLE 5-continued

| | Polyacetal resin (A) | | Hydrazine derivative (B) | | Compound (C) | | | | Main peak temperature °C. | Polyalkylene glycol (D) | | Additive | |
|---|---|---|---|---|---|---|---|---|---|---|---|---|---|
| | Kind | Parts by mass | Kind | Part by mass | Kind | Part by mass | Kind | Part by mass | | Kind | Part by mass | Kind | Part by mass |
| Ex. 33 | a-1 | 100 | bc-1 | 0.025 | bc-2 | 0.025 | — | — | 154 | d-1 | 0.12 | — | — |
| Ex. 34 | a-1 | 100 | bc-1 | 0.1 | bc-2 | 0.1 | — | — | 154 | d-1 | 1.6 | — | — |
| Ex. 35 | a-1 | 100 | bc-1 | 0.085 | bc-2 | 0.085 | — | — | 154 | d-1 | 0.6 | — | — |
| Ex. 36 | a-1 | 100 | bc-1 | 0.05 | bc-2 | 0.05 | — | — | 154 | d-1 | 0.3 | — | — |
| Ex. 37 | a-1 | 100 | bc-1 | 0.075 | bc-2 | 0.075 | — | — | 154 | d-1 | 0.3 | e-1 | 0.15 |
| Ex. 38 | a-1 | 100 | bc-1 | 0.075 | bc-2 | 0.075 | — | — | 154 | d-1 | 0.3 | e-1 f | 0.15 0.03 |
| Ex. 39 | a-1 | 100 | bc-1 | 0.075 | bc-2 | 0.075 | — | — | 154 | d-1 | 0.3 | e-1 f g | 0.15 0.03 0.05 |
| Ex. 40 | a-1 | 100 | bc-1 | 0.075 | bc-2 | 0.075 | — | — | 154 | d-1 | 0.3 | e-1 f g h | 0.15 0.03 0.05 0.3 |
| Ex. 41 | a-1 | 100 | bc-1 | 0.075 | bc-2 | 0.075 | — | — | 154 | d-1 | 0.3 | e-2 f g h | 0.01 0.03 0.05 0.3 |

TABLE 6

| | Polyacetal resin (A) | | Hydrazine derivative (B) | | Compound (C) | | Main peak temperature °C. | Polyalkylene glycol (D) | |
|---|---|---|---|---|---|---|---|---|---|
| | Kind | Parts by mass | Kind | Part by mass | Kind | Part by mass | | Kind | Part by mass |
| Comp. Ex. 1 | a-1 | 100 | — | — | — | — | — | — | — |
| Comp. Ex. 2 | a-2 | 100 | — | — | — | — | — | — | — |
| Comp. Ex. 13 | a-1 | 100 | bc-1 | 0.15 | — | — | — | d-1 | 0.30 |
| Comp. Ex. 14 | a-1 | 100 | bc-1 | 0.075 | bc-4 | 0.075 | None | d-1 | 0.30 |
| Comp. Ex. 15 | a-1 | 100 | bc-2 | 0.075 | bc-4 | 0.075 | None | d-1 | 0.30 |
| Comp. Ex. 16 | a-1 | 100 | bc-1 | 0.075 | bc-5 | 0.075 | None | d-1 | 0.30 |
| Comp. Ex. 17 | a-1 | 100 | bc-4 | 0.075 | bc-5 | 0.075 | None | d-1 | 0.30 |
| Comp. Ex. 18 | a-1 | 100 | bc-1 | 0.15 | — | — | 171 | d-1 | 3.75 |
| Comp. Ex. 19 | a-1 | 100 | bc-1 | 0.15 | — | — | 171 | d-1 | 0.15 |
| Comp. Ex. 20 | a-1 | 100 | bc-2 | 0.15 | — | — | 180 | d-1 | 0.30 |
| Comp. Ex. 21 | a-1 | 100 | bc-2 | 0.15 | — | — | 180 | d-1 | 3.75 |
| Comp. Ex. 22 | a-1 | 100 | bc-2 | 0.15 | — | — | 180 | d-1 | 0.15 |
| Comp. Ex. 23 | a-1 | 100 | bc-1 | 0.015 | bc-2 | 0.135 | 172 | d-1 | 0.30 |
| Comp. Ex. 24 | a-1 | 100 | bc-1 | 0.135 | bc-2 | 0.015 | 168 | d-1 | 0.30 |

TABLE 7

| | Time until crack generation (hr) | Amount of formaldehyde emission (mg/kg) | Amount of MD |
|---|---|---|---|
| Ex. 20 | 648 | 1.91 | A |
| Ex. 21 | 648 | 2.35 | A |
| Ex. 22 | 648 | 1.91 | A |
| Ex. 23 | 648 | 2.35 | A |
| Ex. 24 | 768 | 1.79 | A |
| Ex. 25 | 648 | 1.92 | A |
| Ex. 26 | 636 | 2.08 | A |
| Ex. 27 | 624 | 2.30 | A |
| Ex. 28 | 600 | 2.22 | A |
| Ex. 29 | 600 | 2.19 | A |
| Ex. 30 | 576 | 2.27 | A |
| Ex. 31 | 576 | 2.23 | A |
| Ex. 32 | 528 | 2.78 | A |
| Ex. 33 | 552 | 2.75 | A |
| Ex. 34 | 720 | 2.31 | B |
| Ex. 35 | 696 | 1.81 | A |
| Ex. 36 | 600 | 2.28 | A |
| Ex. 37 | 696 | 1.84 | A |
| Ex. 38 | 732 | 1.84 | A |
| Ex. 39 | 768 | 1.79 | A |
| Ex. 40 | 768 | 1.75 | A |
| Ex. 41 | 768 | 1.75 | A |
| Comp. Ex. 1 | 480 | 5.15 | A |
| Comp. Ex. 2 | 480 | 5.97 | A |
| Comp. Ex. 13 | 492 | 2.31 | C |
| Comp. Ex. 14 | 504 | 2.27 | C |
| Comp. Ex. 15 | 504 | 2.29 | C |
| Comp. Ex. 16 | 504 | 2.28 | C |
| Comp. Ex. 17 | 516 | 2.27 | C |
| Comp. Ex. 18 | 504 | 1.95 | C |
| Comp. Ex. 19 | 492 | 2.58 | C |
| Comp. Ex. 20 | 492 | 2.31 | C |
| Comp. Ex. 21 | 504 | 1.97 | C |
| Comp. Ex. 22 | 492 | 2.61 | C |
| Comp. Ex. 23 | 491 | 2.31 | C |
| Comp. Ex. 24 | 493 | 2.31 | C |

Examples 42 to 55

In each Example, a mixture was obtained by mixing, at the proportion shown in Table 8, the hydrazine derivative (B) and the compound (C) for lowering the melting point of the hydrazine derivative (B), each selected from the carboxylic acid hydrazides (bc-1), (bc-2), and (bc-3) in a tumbler. Then, 100 parts by mass of the polyacetal resin (a-1), (a-2) or (a-5) and the resulting mixture were supplied at the proportion shown in Table 8 to a twin-screw extruder equipped with a vent by using a feeder control and they were melted and kneaded at a barrel temperature of 200° C. at a discharge rate of 20 kg/hr to prepare pellets of a polyacetal resin composition. The resulting pellets were measured for dimensional stability after aging and repeated impact resistance after aging and evaluated for recycling moldability or formability and the amount of MD in the above-described manners.

The main peak temperature of the melting point when the mixture of the hydrazine derivative (B) and the compound (C) for lowering the melting point of the hydrazine derivative (B) used in each Example was subjected to the above-described differential scanning calorimetry was shown in Table 8.

Example 56

To 100 parts by mass of the polyacetal resin (a-5) was added 0.3 part by mass of triethylene glycol bis[3-(3-t-butyl-5-methyl-4-hydroxyphenyl)propionate] as the antioxidant (h), followed by mixing in a tumbler to obtain a polyacetal resin mixture. In addition, the hydrazine derivative (B) and the compound (C) for lowering the melting point of the hydrazine derivative (B) were mixed at the proportion shown in Table 8 in a tumbler to obtain a mixture. The resulting mixture and the polyacetal resin mixture were supplied to a twin-screw extruder equipped with a vent by using a feeder control and then melted and kneaded at a barrel temperature of 200° C. at a discharge rate of 20 kg/hr to prepare pellets of a polyacetal resin composition. The resulting pellets were measured for dimensional stability after aging and repeated impact resistance after aging and evaluated for recycling moldability or formability and the amount of MD. The main peak temperature of the melting point of the mixture of the hydrazine derivative (B) and the compound (C) for lowering the melting point of the hydrazine derivative (B) was 154° C.

Example 57

To 100 parts by mass of the polyacetal resin (a-5) were added 0.3 part by mass of triethylene glycol bis[3-(3-t-butyl-5-methyl-4-hydroxyphenyl)propionate] as the antioxidant (h) and 0.15 part by mass of calcium distearate as the formic acid scavenger (e-1), followed by mixing in a tumbler to obtain a polyacetal resin mixture. In addition, the hydrazine derivative (B) and the compound (C) for lowering the melting point of the hydrazine derivative (B) were mixed at the proportion shown in Table 8 in a tumbler to obtain a mixture. The resulting mixture and the polyacetal resin mixture were melted and kneaded as in Example 56 to prepare pellets of a polyacetal resin composition. The resulting pellets were measured for dimensional stability after aging and repeated impact resistance after aging and evaluated for recycling moldability or formability and the amount of MD. The main peak temperature of the melting point of the mixture of the hydrazine derivative (B) and the compound (C) for lowering the melting point of the hydrazine derivative (B) was 154° C.

Example 58

To 100 parts by mass of the polyacetal resin (a-5) were added 0.3 part by mass of triethylene glycol bis[3-(3-t-butyl-5-methyl-4-hydroxyphenyl)propionate] as the antioxidant (h), 0.15 part by mass of calcium distearate as the formic acid scavenger (e-1), and 0.03 part by mass of ethylene glycol distearate as the mold release agent (f), followed by mixing in a tumbler to obtain a polyacetal resin mixture. In addition, the hydrazine derivative (B) and the compound (C) for lowering the melting point of the hydrazine derivative (B) were mixed at the proportion shown in Table 8 in a tumbler to obtain a mixture. The resulting mixture and the polyacetal resin mixture were melted and kneaded as in Example 56 to prepare pellets of a polyacetal resin composition. The resulting pellets were measured for dimensional stability after aging and repeated impact resistance after aging and evaluated for recycling moldability or formability and the amount of MD in the above-described manners. The main peak temperature of the melting point of the mixture of the hydrazine derivative (B) and the compound (C) for lowering the melting point of the hydrazine derivative (B) was 154° C.

Example 59

To 100 parts by mass of the polyacetal resin (a-5) were added 0.3 part by mass of triethylene glycol bis[3-(3-t-butyl-5-methyl-4-hydroxyphenyl)propionate] as the antioxidant (h), 0.15 part by mass of calcium distearate as the formic acid scavenger (e-1), 0.03 part by mass of ethylene glycol distearate as the mold release agent (F), and 0.05 part by mass of Nylon 6-6 as the polymer (G) having a formaldehyde-reactive nitrogen, followed by mixing in a tumbler to obtain a polyacetal resin mixture. In addition, the hydrazine derivative (B) and the compound (C) for lowering the melting point of the hydrazine derivative (B) were mixed at the proportion shown in Table 8 in a tumbler to obtain a mixture. The resulting mixture and the polyacetal resin mixture were melted and kneaded as in Example 56 to prepare pellets of a polyacetal resin composition. The resulting pellets were measured for dimensional stability after aging and repeated impact resistance after aging and evaluated for recycling moldability or formability and the amount of MD. The main peak temperature of the melting point of the mixture of the hydrazine derivative (B) and the compound (C) for lowering the melting point of the hydrazine derivative (B) was 154° C.

Example 60

To 100 parts by mass of the polyacetal resin (a-5) were added 0.3 part by mass of triethylene glycol bis[3-(3-t-butyl-5-methyl-4-hydroxyphenyl)propionate] as the antioxidant (h), 0.01 part by mass of magnesium silicate as the formic acid scavenger (e-2), 0.03 part by mass of ethylene glycol distearate as the mold release agent (f), and 0.05 part by mass of Nylon 6-6 as the polymer (g) containing a formaldehyde-reactive nitrogen, followed by mixing in a tumbler to obtain a polyacetal resin mixture. In addition, the hydrazine derivative (B) and the compound (C) for lowering the melting point of the hydrazine derivative (B) were mixed at the proportion shown in Table 8 in a tumbler to obtain a mixture. The resulting mixture and the polyacetal resin mixture were mixed in a tumbler. The mixture thus obtained was then supplied to a twin-screw extruder equipped with a vent by using a feeder control and melted and kneaded at a barrel temperature of 200° C. at a discharge rate of 20 kg/hr to prepare pellets of the polyacetal resin composition. The resulting pellets were measured for dimensional stability after aging and repeated impact resistance after aging and evaluated for recycling moldability or formability and the amount of MD in the above-described manners. The main peak temperature of the melting point of the mixture of the hydrazine derivative (B) and the compound (C) for lowering the melting point of the hydrazine derivative (B) was 154° C.

Example 61

To 15 parts by mass of the polyacetal resin (a-1) were added the hydrazine derivative (B) and the compound (C) for lowering the melting point of the hydrazine derivative (B) at the proportion shown in Table 8, followed by mixing in a tumbler. The resulting mixture was melted and kneaded in a twin-screw extruder equipped with a vent to prepare pellets of a pre-mixture. The resulting pellets and 85 parts by mass of the polyacetal resin (a-1) were mixed in a tumbler and then melted and kneaded in a twin-screw extruder equipped with a vent at 200° C. and a discharge rate of 20 kg/hr to prepare pellets of the polyacetal resin composition. The resulting pellets were measured for dimensional stability after aging and repeated impact resistance after aging and evaluated for recycling moldability or formability and the amount of MD in the above-described manners. The main peak temperature of the melting point of a mixture of the hydrazine derivative (B) and the compound (C) for lowering the melting point of the hydrazine derivative (B) was 148° C.

Example 62

To 15 parts by mass of the polyacetal resin (a-1) were added the hydrazine derivative (B) and the compound (C) for lowering the melting point of the hydrazine derivative (B) at the proportion shown in Table 8, followed by mixing in a tumbler to prepare a pre-mixture. The resulting pre-mixture was melted in a twin-screw extruder equipped with a vent equipped with a heating-type mini twin-screw side screw feeder at 200° C. and a discharge rate of 20 kg/hr so that the final formulation of it would have the proportion shown in Table 8. The molten mixture thus obtained and a remaining portion of the polyacetal resin (a-1) were melted and kneaded to prepare the pellets of the corresponding polyacetal resin composition. The resulting pellets were measured for dimensional stability after aging and repeated impact resistance after aging and evaluated for recycling moldability or formability and the amount of MD in the above-described manners. The main peak temperature of the melting point of a mixture of the hydrazine derivative (B) and the compound (C) for lowering the melting point of the hydrazine derivative (B) was 148° C.

Example 63

To 3 parts by mass of the polyacetal resin (a-1) were added the hydrazine derivative (B) and the compound (C) for lowering the melting point of the hydrazine derivative (B) at the proportion shown in Table 8, followed by mixing in a tumbler. The resulting mixture was melted and kneaded in a twin-screw extruder equipped with a vent to prepare pellets of the pre-mixture. The pellets thus obtained and 97 parts by mass of the polyacetal resin (a-1) were mixed in a tumbler and the resulting mixture was melted and kneaded in a twin-screw extruder equipped with a vent at a barrel temperature of 200° C. at a discharge rate of 20 kg/hr to prepare pellets of a polyacetal resin composition. The resulting pellets were measured for dimensional stability after aging and repeated impact resistance after aging and evaluated for recycling moldability or formability and the amount of MD in the above-described manners. The main peak temperature of the melting point of a mixture of the hydrazine derivative (B) and the compound (C) for lowering the melting point of the hydrazine derivative (B) was 154° C.

Example 64

To 3 parts by mass of the polyacetal resin (a-1) were added the hydrazine derivative (B) and the compound (C) for lowering the melting point of the hydrazine derivative (B) at the proportion shown in Table 8, followed by mixing in a tumbler to prepare a pre-mixture. The resulting pre-mixture was melted in a twin-screw extruder equipped with a vent equipped with a heating-type mini twin-screw side screw feeder at 200° C. and a discharge rate of 200 kg/hr so that the final formulation of it would have the proportion shown in Table 8. The molten mixture thus obtained and a remaining portion of the polyacetal resin (a-1) were melted and kneaded to prepare pellets of a polyacetal resin composition. The resulting pellets were measured for dimensional stability after aging and repeated impact resistance after aging and evaluated for recycling moldability or formability and the amount of MD in the above-described manners. The main peak temperature of the melting point of a mixture of the hydrazine derivative (B) and the compound (C) for lowering the melting point of the hydrazine derivative (B) was 154° C.

Examples 65 and 66

In each example, 100 parts by mass of the polyacetal resin (a-1) was melted in a twin-screw extruder equipped with a vent at a barrel temperature of 200° C. and a discharge rate of 20 kg/hr. The hydrazine derivative (B) and the compound (C) for lowering the melting point of the hydrazine derivative (B) were melted at the proportion shown in Table 8 in a tank kept at 190° C. The hydrazine derivative (B) and the compound (C) for lowering the melting point of the hydrazine derivative (B) thus melted were charged in the extruder through a pump for liquid from a position one-tenth of the whole length of the kneading zone of the extruder with the outlet of the extruder as a starting point. The resulting mixture was melted and kneaded together with the molten polyacetal resin (a-1) to prepare pellets of a polyacetal resin composition. The amount of the mixture of the hydrazine derivative (B) and the compound (C) for lowering the melting point of the hydrazine derivative (B) to the amount of the polyacetal resin (a-1) charged in the extruder was adjusted to 0.15/100 (mass ratio). The resulting pellets were measured for dimensional stability after aging and repeated impact resistance after aging and evaluated for recycling moldability or formability and the amount of MD in the above-described manners. The main peak temperature of the melting point of the mixture of the hydrazine derivative (B) and the compound (C) for lowering the melting point of the hydrazine derivative (B) was 148° C. in Example 65 and 154° C. in Example 66.

Example 67

To 100 parts by mass of the polyacetal resin (a-1) were added 0.3 part by mass of triethylene glycol bis[3-(3-t-butyl-5-methyl-4-hydroxyphenyl)propionate] as the antioxidant (h), 0.01 part by mass of magnesium silicate as the formic acid scavenger (e-2), 0.03 part by mass of ethylene glycol distearate as the mold release agent (f), and 0.05 part by mass of Nylon 6-6 as the polymer (g) containing a formaldehyde-reactive nitrogen, followed by mixing in a tumbler. The resulting mixture was melted in a twin-screw extruder equipped with a vent at a barrel temperature of 200° C. and a discharge rate of 20 kg/hr. Separately, the hydrazine derivative (B) and the compound (C) for lowering the melting point of the hydrazine derivative (B) were melted at the proportion shown in Table 8 in a tank kept at 190° C. The hydrazine derivative (B) and the compound (C) for lowering the melting point of the hydrazine derivative (B) thus melted were charged in the extruder through a pump for liquid from a position one-tenth of the whole length of the kneading zone of the extruder with the outlet of the extruder as a starting point. The resulting mixture was melted and kneaded together with the molten polyacetal resin (a-1) to prepare pellets of a polyacetal resin composition. The amount of the mixture of the hydrazine derivative (B) and the compound (C) for lowering the melting point of the hydrazine derivative (B) to the amount of the polyacetal resin (a-1) charged in the extruder was adjusted to 0.15/100.39 (mass ratio). The resulting pellets were measured for dimensional stability after aging and repeated impact resistance after aging and evaluated for recycling moldability or formability and the amount of MD in the above-described manners. The main peak temperature of the melting point of the mixture of the hydrazine derivative (B) and the compound (C) for lowering the melting point of the hydrazine derivative (B) was 154° C.

Comparative Example 25

Pellets of a polyacetal resin composition were prepared by melting and kneading 100 parts by mass of the polyacetal resin (a-1) in a twin-screw extruder equipped with a vent at a barrel temperature of 200° C. and a charge rate of 20 kg/hr. The resulting pellets were measured for dimensional stability after aging and repeated impact resistance after aging and evaluated for recycling moldability or formability and the amount of MD in the above-described manners.

Comparative Example 26

In a similar manner to that employed in Comparative Example 25 except for the use of the polyacetal resin (a-2) instead of the polyacetal resin (a-1), pellets of a polyacetal resin composition were prepared.

Comparative Example 27

In a similar manner to that employed in Comparative Example 25 except for the use of the polyacetal resin (a-5) instead of the polyacetal resin (a-1), pellets of a polyacetal resin composition were prepared.

Comparative Examples 28 to 31

In each Comparative Example, to 100 parts by mass of the polyacetal resin (a-1) were added the hydrazine derivative (B) and the compound (C) for lowering the melting point of the hydrazine derivative (B) at the proportion shown in Table 9, followed by mixing in a tumbler. The resulting mixture was melted and kneaded in a twin-screw extruder equipped with a vent at a barrel temperature of 200° C. and a discharge rate of 20 kg/hr to prepare pellets of a polyacetal resin composition. The resulting pellets were measured for dimensional stability after aging and repeated impact resistance after aging and evaluated for recycling moldability or formability and the amount of MD. The main peak temperature of the melting point of the mixture of the hydrazine derivative (B) and the compound (C) for lowering the melting point of the hydrazine derivative (B) used in Comparative Examples and Example 1 are shown in Table 9.

Comparative Examples 32 to 36

In each Comparative Example, the hydrazine derivative (B) and the compound (C) for lowering the melting point of the hydrazine derivative (B) shown in Table 9 were mixed at the proportion shown in Table 9 in a tumbler. The resulting mixture and 100 parts by mass of the polyacetal resin (a-1) were charged in a twin-screw extruder equipped with a vent at the proportion shown in Table 9, followed by melting and kneading at a barrel temperature of 200° C. and a discharge rate of 20 kg/hr to prepare pellets of a polyacetal resin composition. The resulting pellets were measured for dimensional stability after aging and repeated impact resistance after aging and evaluated for recycling moldability or formability and the amount of MD in the above-described manners. The main peak temperature of the melting point of a mixture of the hydrazine derivative (B) and the compound (C) for lowering the melting point of the hydrazine derivative (B) used in each Comparative Example is shown in Table 3.

The compositions of the polyacetal resin compositions obtained in Example 1, Examples 42 to 67, and Comparative Examples 25 to 36 are shown in Tables 8 and 9, while the evaluation results of dimensional stability after aging, the repeated impact resistance after aging, recycling moldability or formability, that is, an amount of formaldehyde emission from molded or formed products, and the amount of MD are shown in Table 10.

From the results shown in Tables 8 to 10, it has been understood that the polyacetal resin compositions obtained by the preparation process of the present invention are excellent in secondary shrinkage, reducing mold deposit under the condition of a low resin filling rate in a mold, and repeated impact resistance after aging. It has also been found that molded or formed products composed of the polyacetal resin composition obtained by the preparation process of the present invention are particularly excellent in recycling moldability or formability because the amount of formaldehyde emission after recycling molding or forming is kept at a markedly low level.

TABLE 8

|  | Polyacetal resin (A) | | Carboxylic acid hydrazide (B) | | Compound (C) | | | | Main peak temperature ° C. | Additive | |
|---|---|---|---|---|---|---|---|---|---|---|---|
|  | Kind | Parts by mass | Kind | Part by mass | Kind | Part by mass | Kind | Part by mass |  | Kind | Part by mass |
| Ex. 42 | a-1 | 100 | bc-1 | 0.075 | bc-2 | 0.075 | — | — | 154 | — | — |
| Ex. 43 | a-2 | 100 | bc-1 | 0.075 | bc-2 | 0.075 | — | — | 154 | — | — |
| Ex. 44 | a-5 | 100 | bc-1 | 0.075 | bc-2 | 0.075 | — | — | 154 | — | — |
| Ex. 45 | a-1 | 100 | bc-1 | 0.105 | bc-2 | 0.045 | — | — | 148 | — | — |

TABLE 8-continued

| | Polyacetal resin (A) | | Carboxylic acid hydrazide (B) | | Compound (C) | | | | Main peak temperature ° C. | Additive | |
|---|---|---|---|---|---|---|---|---|---|---|---|
| | Kind | Parts by mass | Kind | Part by mass | Kind | Part by mass | Kind | Part by mass | | Kind | Part by mass |
| Ex. 46 | a-1 | 100 | bc-1 | 0.045 | bc-2 | 0.105 | — | — | 150 | — | — |
| Ex. 47 | a-1 | 100 | bc-1 | 0.07 | bc-2 | 0.07 | bc-3 | 0.01 | 154 | — | — |
| Ex. 48 | a-5 | 100 | bc-2 | 0.075 | bc-3 | 0.075 | — | — | 144 | — | — |
| Ex. 49 | a-1 | 100 | bc-1 | 0.075 | bc-3 | 0.075 | — | — | 151 | — | — |
| Ex. 50 | a-5 | 100 | bc-1 | 0.075 | bc-3 | 0.075 | — | — | 151 | — | — |
| Ex. 51 | a-1 | 100 | bc-1 | 0.004 | bc-2 | 0.004 | — | — | 154 | — | — |
| Ex. 52 | a-1 | 100 | bc-1 | 0.006 | bc-2 | 0.006 | — | — | 154 | — | — |
| Ex. 53 | a-1 | 100 | bc-1 | 0.10 | bc-2 | 0.10 | — | — | 154 | — | — |
| Ex. 54 | a-1 | 100 | bc-1 | 0.085 | bc-2 | 0.085 | — | — | 154 | — | — |
| Ex. 55 | a-1 | 100 | bc-1 | 0.015 | bc-2 | 0.015 | — | — | 154 | — | — |
| Ex. 56 | a-5 | 100 | bc-1 | 0.075 | bc-2 | 0.075 | — | — | 154 | h | 0.30 |
| Ex. 57 | a-5 | 100 | bc-1 | 0.075 | bc-2 | 0.075 | — | — | 154 | h | 0.30 |
| | | | | | | | | | | e-1 | 0.15 |
| Ex. 58 | a-5 | 100 | bc-1 | 0.075 | bc-2 | 0.075 | — | — | 154 | h | 0.30 |
| | | | | | | | | | | e-1 | 0.15 |
| | | | | | | | | | | f | 0.03 |
| Ex. 59 | a-5 | 100 | bc-1 | 0.075 | bc-2 | 0.075 | — | — | 154 | h | 0.30 |
| | | | | | | | | | | e-1 | 0.15 |
| | | | | | | | | | | f | 0.03 |
| | | | | | | | | | | g | 0.05 |
| Ex. 60 | a-5 | 100 | bc-1 | 0.075 | bc-2 | 0.075 | — | — | 154 | h | 0.30 |
| | | | | | | | | | | e-2 | 0.01 |
| | | | | | | | | | | f | 0.03 |
| | | | | | | | | | | g | 0.05 |
| Ex. 61 | a-1 | 15 + 85 | bc-1 | 0.105 | bc-2 | 0.045 | — | — | 148 | — | — |
| Ex. 62 | a-1 | 15 + 85 | bc-1 | 0.105 | bc-2 | 0.045 | — | — | 148 | — | — |
| Ex. 63 | a-1 | 3 + 97 | bc-1 | 0.075 | bc-2 | 0.075 | — | — | 154 | — | — |
| Ex. 64 | a-1 | 3 + 97 | bc-1 | 0.075 | bc-2 | 0.075 | — | — | 154 | — | — |
| Ex. 65 | a-1 | 100 | bc-1 | 0.105 | bc-2 | 0.045 | — | — | 148 | — | — |
| Ex. 66 | a-1 | 100 | bc-1 | 0.075 | bc-2 | 0.075 | — | — | 154 | — | — |
| Ex. 67 | a-1 | 100 | bc-1 | 0.075 | bc-2 | 0.075 | — | — | 154 | h | 0.30 |
| | | | | | | | | | | e-2 | 0.01 |
| | | | | | | | | | | f | 0.03 |
| | | | | | | | | | | g | 0.05 |

TABLE 9

| | Polyacetal resin (A) | | Carboxylic acid hydrazide (B) | | | | Main peak temperature ° C. |
|---|---|---|---|---|---|---|---|
| | Kind | Parts by mass | Kind | Parts by mass | Kind | Parts by mass | |
| Comp. Ex. 25 | a-1 | 100 | — | — | — | — | — |
| Comp. Ex. 26 | a-2 | 100 | — | — | — | — | — |
| Comp. Ex. 27 | a-5 | 100 | — | — | — | — | — |
| Comp. Ex. 28 | a-1 | 100 | bc-1 | 0.15 | — | — | 171 |
| Comp. Ex. 29 | a-1 | 100 | bc-2 | 0.15 | — | — | 180 |
| Comp. Ex. 30 | a-1 | 100 | bc-4 | 0.15 | — | — | None |
| Comp. Ex. 31 | a-1 | 100 | bc-5 | 0.15 | — | — | None |
| Comp. Ex. 32 | a-1 | 100 | bc-4 | 0.075 | bc-5 | 0.075 | None |
| Comp. Ex. 33 | a-1 | 100 | bc-2 | 0.075 | bc-4 | 0.075 | None |
| Comp. Ex. 34 | a-1 | 100 | bc-3 | 0.075 | bc-4 | 0.075 | None |
| Comp. Ex. 35 | a-1 | 100 | bc-1 | 0.015 | bc-2 | 0.135 | 172 |
| Comp. Ex. 36 | a-1 | 100 | bc-1 | 0.135 | bc-2 | 0.015 | 168 |
| Ex. 1 | a-1 | 100 | bc-1 | 0.075 | bc-2 | 0.075 | 154 |

TABLE 10

| | Second shrinkage (%) | Repeated impact resistance after aging (frequency) | Recycling moldability or formability 5 times Amount of formaldehyde emission (mg/kg) | 10 times Amount of formaldehyde emission (mg/kg) | Amount of MD |
|---|---|---|---|---|---|
| Ex. 42 | 0.03 | 4120 | 0.89 | 1.62 | A |
| Ex. 43 | 0.07 | 1057 | 0.90 | 1.62 | A |
| Ex. 44 | 0.05 | 4728 | 0.89 | 1.63 | A |
| Ex. 45 | 0.03 | 4115 | 0.89 | 1.62 | A |
| Ex. 46 | 0.03 | 4117 | 0.89 | 1.62 | A |
| Ex. 47 | 0.04 | 3884 | 0.92 | 1.66 | A |
| Ex. 48 | 0.06 | 4467 | 0.93 | 1.67 | A |
| Ex. 49 | 0.05 | 3567 | 0.94 | 1.69 | A |
| Ex. 50 | 0.07 | 4105 | 0.95 | 1.71 | A |
| Ex. 51 | 0.09 | 2922 | 1.14 | 2.23 | A |
| Ex. 52 | 0.06 | 3975 | 1.12 | 2.17 | A |
| Ex. 53 | 0.05 | 3692 | 0.86 | 1.93 | A |
| Ex. 54 | 0.04 | 4181 | 0.88 | 1.56 | A |
| Ex. 55 | 0.08 | 4873 | 1.03 | 2.13 | A |
| Ex. 56 | 0.02 | 5202 | 0.87 | 1.54 | A |
| Ex. 57 | 0.02 | 5358 | 0.87 | 1.53 | A |
| Ex. 58 | 0.02 | 5347 | 0.84 | 1.48 | A |
| Ex. 59 | 0.02 | 5489 | 0.82 | 1.39 | A |
| Ex. 60 | 0.02 | 5482 | 0.82 | 1.40 | A |
| Ex. 61 | 0.02 | 4593 | 0.89 | 1.62 | A |
| Ex. 62 | 0.02 | 4591 | 0.89 | 1.62 | A |
| Ex. 63 | 0.03 | 4588 | 0.89 | 1.63 | A |
| Ex. 64 | 0.03 | 4586 | 0.89 | 1.63 | A |
| Ex. 65 | 0.03 | 4584 | 0.88 | 1.62 | A |
| Ex. 66 | 0.03 | 4578 | 0.89 | 1.63 | A |
| Ex. 67 | 0.02 | 5314 | 0.82 | 1.39 | A |
| Comp. Ex. 25 | 0.24 | 1516 | 1.41 | 4.10 | A |
| Comp. Ex. 26 | 0.30 | 429 | 1.43 | 4.14 | A |
| Comp. Ex. 27 | 0.27 | 3391 | 1.41 | 4.13 | A |
| Comp. Ex. 28 | 0.07 | 2948 | 1.26 | 2.72 | C |
| Comp. Ex. 29 | 0.07 | 2972 | 1.01 | 2.03 | C |
| Comp. Ex. 30 | 0.08 | 2913 | 1.13 | 2.12 | C |
| Comp. Ex. 31 | 0.08 | 2938 | 1.15 | 2.17 | C |
| Comp. Ex. 32 | 0.09 | 2943 | 1.00 | 2.01 | C |
| Comp. Ex. 33 | 0.07 | 2939 | 1.15 | 2.15 | C |
| Comp. Ex. 34 | 0.07 | 2947 | 1.15 | 2.15 | C |
| Comp. Ex. 35 | 0.07 | 2976 | 1.01 | 2.02 | C |
| Comp. Ex. 36 | 0.07 | 2952 | 1.26 | 2.72 | C |
| Ex. 1 | 0.05 | 3583 | 0.95 | 1.73 | A |

The present application is based on Japanese Patent Application No. 2008-277280 filed on Oct. 28, 2008, Japanese Patent Application No. 2008-208490 filed on Dec. 3, 2008, and Japanese Patent Application No. 2009-42189 filed on Feb. 25, 2009, the contents of which are incorporated herein by reference.

As described above, the polyacetal resin compositions of the present invention are well balanced in mechanical properties that a polyacetal resin originally has and are excellent in dimensional stability after aging, repeated impact resistance after aging, recycling moldability or formability, hot water resistance, reduction in an amount of formaldehyde generated after sliding, suppression of crack generation under aging, and reducing mold deposit under the condition of a low resin filling rate in a mold so that they are suited for use in the industrial fields including automotive, electrical, and electronics fields.

As described above, the polyacetal resin compositions prepared according to the present invention are resin compositions not only excellent in repeated impact resistance after aging and recycling moldability or formability but also well balanced in mechanical properties that the polyacetal resin originally has and at the same time, excellent in dimensional stability after aging and reducing mold deposit under the condition of a low resin filling rate in a mold. Accordingly, the present invention provides a preparation process capable of preparing a polyacetal resin composition suited for use in the industrial fields including automotive, electrical, and electronic fields.

The invention claimed is:

1. A polyacetal resin composition obtained by a process comprising mixing a polyacetal resin with a mixture of a first hydrazine derivative and a compound for lowering the melting point of the first hydrazine derivative,
wherein the mixture of the first hydrazine derivative and the compound for lowering the melting point of the first hydrazine derivative satisfies the conditions represented by the following formulas (1) and (2):

$$T1 < T2 \tag{1}$$

$$T1 < T3 \tag{2}$$

wherein T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min, and wherein the first hydrazine derivative and the compound for lowering the melting point of the first hydrazine derivative respectively contain carboxylic acid dihydrazides selected from the group consisting of adipic acid dihydrazide and sebacic acid dihydrazide, but different from each other.

2. The polyacetal resin composition according to claim 1, wherein the process further comprises mixing a polyalkylene glycol in an amount of from 2 to 20 times the mass of the mixture of the first hydrazine derivative and the compound for lowering the melting point of the first hydrazine derivative.

3. The polyacetal resin composition according to claim 2, wherein the polyalkylene glycol has a number average molecular weight of from 300 to 10000.

4. The polyacetal resin composition according to claim 3, wherein the polyalkylene glycol is polyethylene glycol.

5. A process for preparing a polyacetal resin composition according to claim 1, comprising:

a first step of preparing the mixture of the first hydrazine derivative and the compound for lowering the melting point of the first hydrazine derivative, the mixture satisfying the conditions represented by the following formulas (1) and (2):

$$T1 < T2 \quad (1)$$

$$T1 < T3 \quad (2)$$

wherein T1 is a temperature (° C.) showing an apex of an endothermic peak of the mixture having a maximum endothermic capacity, among endothermic peaks obtained by, with a differential scanning calorimeter, heating and cooling the mixture in accordance with a predetermined temperature program and then heating at a rate of 2.5° C./min until the mixture fuses, T2 is a temperature (° C.) showing an apex of an endothermic peak of the first hydrazine derivative having a maximum endothermic capacity, among endothermic peaks obtained by, with the differential scanning calorimeter, heating and cooling the first hydrazine derivative in accordance with a predetermined temperature program and then heating at a rate of 2.5° C./min, and T3 is a temperature (° C.) showing an apex of an endothermic peak of the polyacetal resin having a maximum endothermic capacity, among endothermic peaks obtained by, with the differential scanning calorimeter, heating and cooling the polyacetal resin in accordance with a predetermined temperature program and then heating at a rate of 2.5° C./min;

and a second step of melting and kneading the mixture obtained through the first step with the polyacetal resin.

6. The process for preparing a polyacetal resin composition according to claim 5, further comprising a third step of melting the mixture obtained through the first step, wherein the molten mixture obtained through the third step is supplied to the second step.

7. The process for preparing a polyacetal resin composition according to claim 5, wherein a total content of the first hydrazine derivative and the compound for lowering the melting point of the first hydrazine derivative is from 0.03 to 0.2 part by mass based on 100 parts by mass of the polyacetal resin.

8. The process for preparing a polyacetal resin composition according to claim 5, wherein a content ratio of the first hydrazine derivative to the compound for lowering the melting point of the first hydrazine derivative is from 2:8 to 8:2 by mass.

9. The process for preparing a polyacetal resin composition according to claim 5, wherein a content ratio of the first hydrazine derivative to the compound for lowering the melting point of the first hydrazine derivative is from 3:7 to 7:3 by mass.

10. The process for preparing a polyacetal resin composition according to claim 5, wherein a peak area of an endothermic peak of a 1:1 (mass ratio) mixture of the first hydrazine derivative and the compound for lowering the melting point of the first hydrazine derivative having a maximum endothermic capacity is less than 95% of a total peak area of all the endothermic peaks of the mixture.

11. The process for preparing a polyacetal resin composition according to claim 5, wherein the polyacetal resin is a polyacetal copolymer.

12. The process for preparing a polyacetal resin composition according to claim 5, wherein the polyacetal resin is a polyacetal copolymer containing one or more comonomers selected from the group consisting of ethylene oxide, propylene oxide, epichlorohydrin, 1,3-dioxolane, and 1,4-butanediol formal in an amount of from 0.0013 to 0.0039 mol per mol of trioxane.

13. The polyacetal resin composition according to claim 1, wherein a total content of the first hydrazine derivative and the compound for lowering the melting point of the first hydrazine derivative is from 0.03 to 0.2 part by mass based on 100 parts by mass of the polyacetal resin.

14. The polyacetal resin composition according to claim 1, wherein a content ratio of the first hydrazine derivative to the compound for lowering the melting point of the first hydrazine derivative is from 2:8 to 8:2 by mass.

15. The polyacetal resin composition according to claim 1, wherein a content ratio of the first hydrazine derivative to the compound for lowering the melting point of the first hydrazine derivative is from 3:7 to 7:3 by mass.

16. The polyacetal resin composition according to claim 1, wherein a peak area of an endothermic peak of a 1:1 (mass ratio) mixture of the first hydrazine derivative and the compound for lowering the melting point of the first hydrazine derivative having a maximum endothermic capacity is less than 95% of a total peak area of all the endothermic peaks of the mixture.

17. The polyacetal resin composition according to claim 1, wherein the polyacetal resin is a polyacetal copolymer.

18. The polyacetal resin composition according to claim 1, wherein the polyacetal resin is a polyacetal copolymer obtained by chain transfer reaction with methylal.

19. A molded or formed product for automotive interior or mechanism comprising the polyacetal composition resin as claimed in claim 1.

20. The polyacetal resin composition according to claim 1, wherein a thermally unstable terminal group has been removed from the polyacetal resin.

21. The process for preparing a polyacetal resin composition according to claim 5, further comprising a step of conducting removal treatment of a thermally unstable terminal group of the polyacetal resin.

22. The molded or formed product for automotive interior or mechanism according to claim 19, selected from the group consisting of doors, sunroofs, sheet belts, switches, clips, sheets, and wipers.

* * * * *